(12) United States Patent
Sun et al.

(10) Patent No.: US 12,441,763 B2
(45) Date of Patent: Oct. 14, 2025

(54) HANGTAIMYCIN DERIVATIVES AND THEIR PREPARATION METHODS AND APPLICATION

(71) Applicant: WUHAN UNIVERSITY, Hubei (CN)

(72) Inventors: Yuhui Sun, Hubei (CN); Minghe Luo, Hubei (CN); Yanqin Li, Hubei (CN); Jin Xiang, Hubei (CN); Zixin Deng, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/955,985

(22) Filed: Nov. 22, 2024

(65) Prior Publication Data

US 2025/0115639 A1 Apr. 10, 2025

Related U.S. Application Data

(63) Continuation of application No. PCT/CN2023/096753, filed on May 29, 2023.

(30) Foreign Application Priority Data

Jun. 7, 2022 (CN) .......................... 202210639069.3

(51) Int. Cl.
| | |
|---|---|
| *C07K 5/103* | (2006.01) |
| *A61K 38/00* | (2006.01) |
| *A61P 1/16* | (2006.01) |
| *A61P 25/04* | (2006.01) |
| *A61P 25/36* | (2006.01) |
| *A61P 29/00* | (2006.01) |
| *A61P 35/00* | (2006.01) |
| *C07K 1/20* | (2006.01) |
| *C12P 21/02* | (2006.01) |
| *C12R 1/465* | (2006.01) |

(52) U.S. Cl.
CPC ............. *C07K 5/1008* (2013.01); *A61P 1/16* (2018.01); *A61P 25/04* (2018.01); *A61P 25/36* (2018.01); *A61P 29/00* (2018.01); *A61P 35/00* (2018.01); *C07K 1/20* (2013.01); *C12P 21/02* (2013.01); *A61K 38/00* (2013.01); *C12R 2001/465* (2021.05)

(58) Field of Classification Search
None
See application file for complete search history.

(56) References Cited

FOREIGN PATENT DOCUMENTS

| CN | 111607603 | 9/2020 |
| CN | 115385985 | 11/2022 |

OTHER PUBLICATIONS

Xin L "New drug molecule developed against superbug:Breakthroughs on active natural products against resistant bacteria" Wuhan University Office of International Affairs. https://en.whu.edu.cn/info/3831/33351.htm (Year: 2017).*
Zou et al. "Hangtaimycin, a peptide secondary metabolite discovered from Streptomyces spectabilis CPCC 200148 by chemical screening" J. Antibiot. 69:835-838. (Year: 2016).*
Yuanzhen Liu et al., "Functional Analysis of Cytochrome P450s Involved in Streptovaricin Biosynthesis and Generation of Anti-MRSA Analogues" with Supporting Information, ACS Chemical Biology, Aug. 2017, pp. 1-55.
Minghe Luo et al., "The Mechanism of Dehydrating Bimodules in trans-Acyltransferase Polyketide Biosynthesis: A Showcase Study on Hepatoprotective Hangtaimycin", Angewandte Chemie International Edition, Aug. 23, 2021, pp. 19139-19143, vol. 60.
Denghong Zhang et al., "The inhibitory effect of saPLIy, a snake sourced PLA2 inhibitor on carrageenan-induced inflammation in mice", Toxicon, Jul. 9, 2018, pp. 89-95, vol. 151.
Rediet Tesfaye et al., "Evaluation of Analgesic and Anti-inflammatory Potential of 80% Methanol Leaf Extract of Otostegia integrifolia Benth (Lamiaceae)", Journal of Inflammation Research, 2020, pp. 1175-1183, vol. 13.
Minghe Luo et al., "Supporting Information—The Mechanism of Dehydrating Bimodules in trans-Acyltransferase Polyketide Biosynthesis: A Showcase Study on Hepatoprotective Hangtaimycin", Angewandte Chemie, Aug. 23, 2021, pp. 1-64.
Xingxing Li et al., "Cytochrome P450 Monooxygenase for Catalyzing C☐42 Hydroxylation of the Glycine-Derived Fragment in Hangtaimycin Biosynthesis", Organic Letters, Feb. 9, 2022, pp. 1388-1393, vol. 24.
Lijie Zuo et al., "Hangtaimycin, a peptide secondary metabolite discovered from Streptomyces spectabilis CPCC 200148 by chemical screening", The Journal of Antibiotics, Mar. 9, 2016, pp. 835-838, vol. 69.
"International Search Report (Form PCT/ISA/210) of PCT/CN2023/096753", mailed on Sep. 15, 2023, with English translation thereof, pp. 1-6.
"Written Opinion of the International Searching Authority (Form PCT/ISA/237) of PCT/CN2023/096753", mailed on Sep. 15, 2023, pp. 1-5.

\* cited by examiner

*Primary Examiner* — Sudhakar Katakam
*Assistant Examiner* — Zachary J Miknis
(74) *Attorney, Agent, or Firm* — JCIP GLOBAL INC.

(57) ABSTRACT

The embodiment of the present invention discloses Hangtaimycin derivatives and their preparation and application. Hangtaimycin derivatives are obtained by fermentation of *Streptomyces spectabilis* CCTCC M2017417 and its genetically knockout mutant strain in SFMR medium, with further isolation, purification, and alcoholysis. Through screening, Hangtaimycin derivatives showed excellent anti-inflammatory and analgesic, anti-tumor, liver injury protection, cell membrane protection, and drug addiction prevention activities, providing new drug leads for developing related drugs.

6 Claims, 37 Drawing Sheets

Specification includes a Sequence Listing.

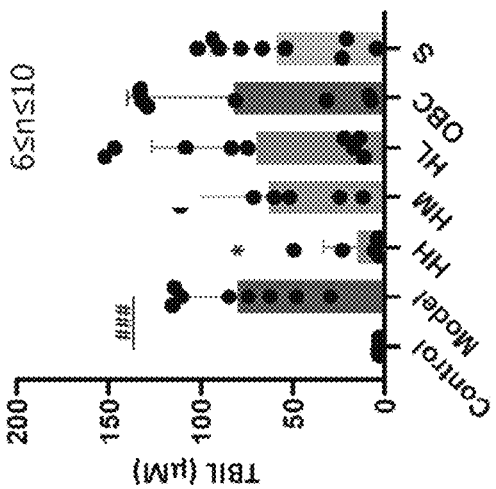
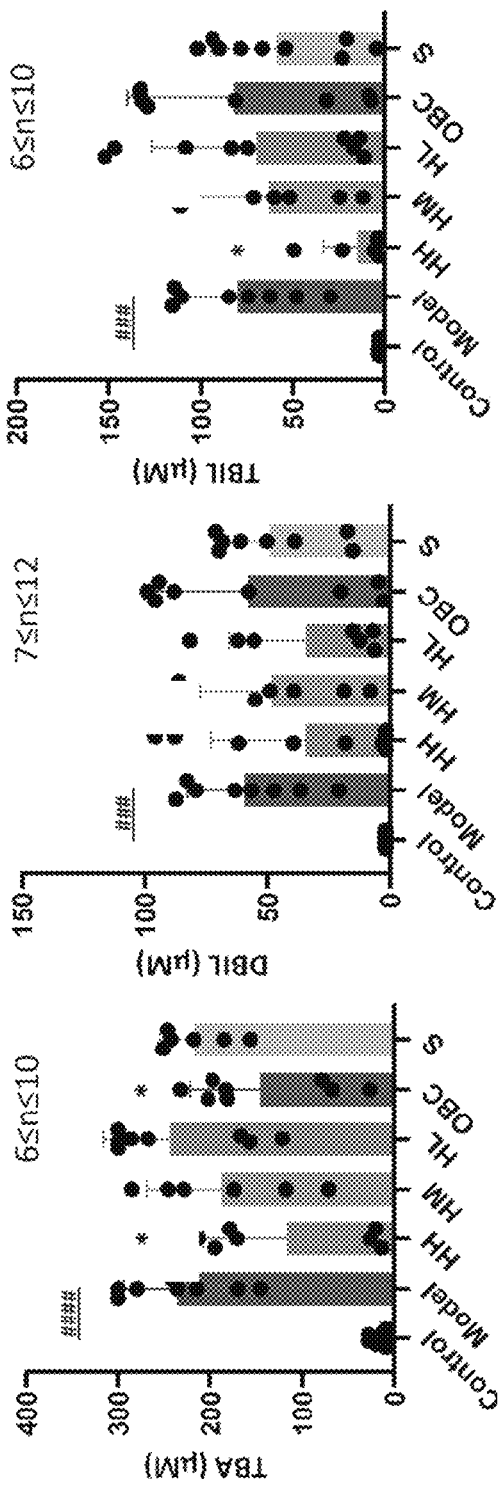
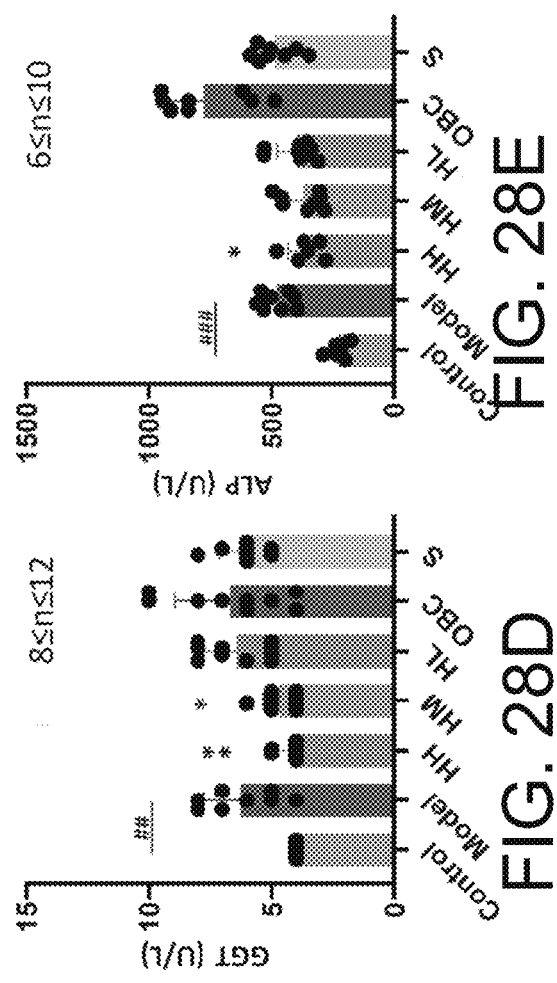

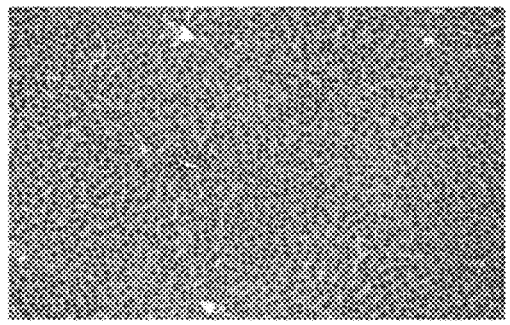
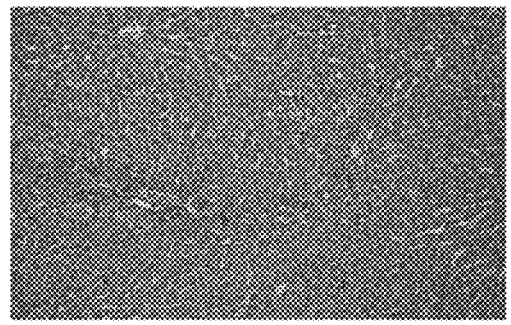
FIG. 29A　　　　　　　FIG. 29B
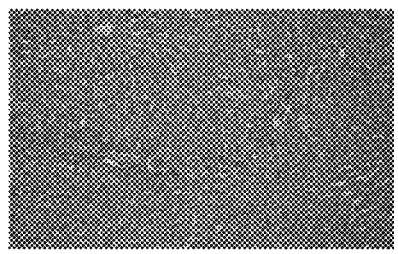
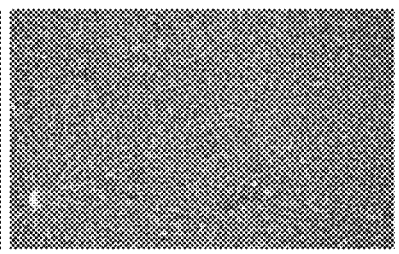
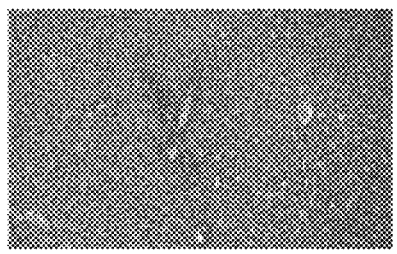
FIG. 30A　　　FIG. 30B　　　FIG. 30C
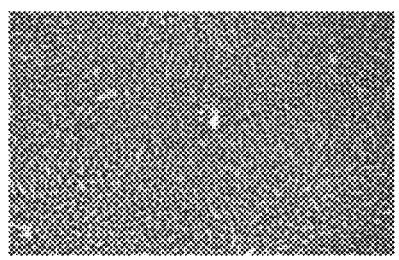
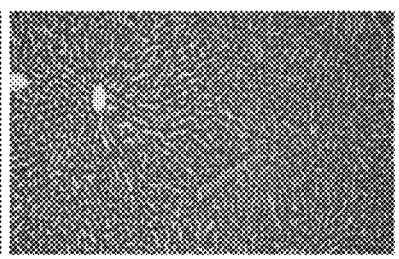
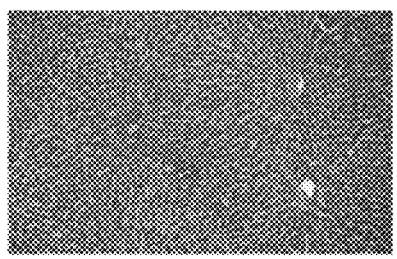
FIG. 30D　　　FIG. 30E　　　FIG. 30F

HANGTAIMYCIN DERIVATIVES AND THEIR PREPARATION METHODS AND APPLICATION

CROSS-REFERENCE TO RELATED APPLICATION

This application is a continuation of international application of PCT application serial no. PCT/CN2023/096753, filed on May 29, 2023, which claims the priority benefit of China application no. 202210639069.3 filed on Jun. 7, 2022. The entirety of each of the above-mentioned patent applications is hereby incorporated by reference herein and made a part of this specification.

REFERENCE TO A SEQUENCE LISTING

The instant application contains a Sequencing Listing which has been submitted electronically in XML file and is hereby incorporated by reference in its entirety. Said XML copy, created on Nov. 14, 2024, is named 150613-US-SEQUENCING_LIST and is 6,615 bytes in size.

TECHNICAL FIELD

The embodiment of the present invention belongs to the field of pharmaceutical biotechnology, specifically containing Hangtaimycin derivatives, their preparation method, and application.

RELATED ART

Inflammation is a common pathological process in many diseases, and any factor leaded to tissue damage could become the cause of inflammation, for example: 1) Biological factors, such as bacteria, viruses, rickettsia, mycoplasma, fungi, spirochetes, and parasites; 2) Physical factors, such as high temperature, low temperature, radioactive substances, ultraviolet radiation, and mechanical damage; 3) Chemical factors, such as exogenous chemicals such as strong acids, strong bases, turpentine, mustard gas, and endogenous toxic substances of decomposition products of necrotic tissue and metabolites accumulated in the body under certain pathological conditions; 4) Foreign objects, such as various metal, wood debris, dust particles, and surgical sutures; 5) Necrosis of tissue caused by factors of ischemia or hypoxia; 6) Allergic reactions: including type I allergic reactions of allergic rhinitis, urticaria, and type II allergic reactions of anti-basement membrane glomerulonephritis, type III allergic reactions of glomerulonephritis caused by immune complex deposition, type IV allergic reactions of tuberculosis and typhoid fever, as well as many autoimmune diseases, such as lymphocytic thyroiditis and ulcerative colitis. Inflammatory factors can cause pain and are also involved in processes such as liver tissue damage, tumor development, and drug addiction.

Hangtaimycin (HTM) was initially isolated from *Streptomyces spectabilis* CPCC200148 in 2016, and our research team also isolated HTM from another strain of *Streptomyces spectabilis* CCTCC M2017417. In order to further investigate the biological activity and application value of HTM derivatives, we added resin to obtain a large amount of Deoxyhangtaimycin (HTMP) from the fermentation products of a cytochrome P450 encoding gene htmP in-frame knockout mutant (ΔhtmP). For the first time, new HTM derivatives Hangtaimycin A (HTMA) and Hangtaimycin B (HTMB) were prepared from *Streptomyces spectabilis* CCTCC M2017417 and its gene knockout mutant strain ΔhtmP through alcoholysis, and their anti-inflammatory, liver protecting, anti-tumor, analgesic, and therapeutic effects on morphine and cocaine addiction were first screened and reported here. The present invention shows that HTM derivatives have excellent liver protection, anti-inflammatory, analgesic, and therapeutic effects on morphine and cocaine addiction and have good prospects for developing anti-inflammatory, analgesic, anti-tumor, liver injury protection, and drug addiction prevention and treatment drugs. It has been found that the removal of the C-42 hydroxyl group in the structure of the derivative and the methanol alcoholysis of the cyclic dipeptide can enhance its anti-inflammatory activity, providing a structure-activity relationship direction for further chemical structural modification.

SUMMARY OF INVENTION

1. The first purpose of this embodiment of the present invention is to provide derivatives of HTM.
2. The second objective of the embodiment of the present invention is to provide an efficient preparation method of HTM derivatives of HTMP, HTMA, and HTMB.

To achieve the above objectives, the technical solution of the embodiment of the present invention is as following:

Firstly, the embodiment of the present invention provides HTM derivatives, characterized in that it includes alcoholysis derivatives of HTMA and HTMB, and their chemical structural formula is as following:

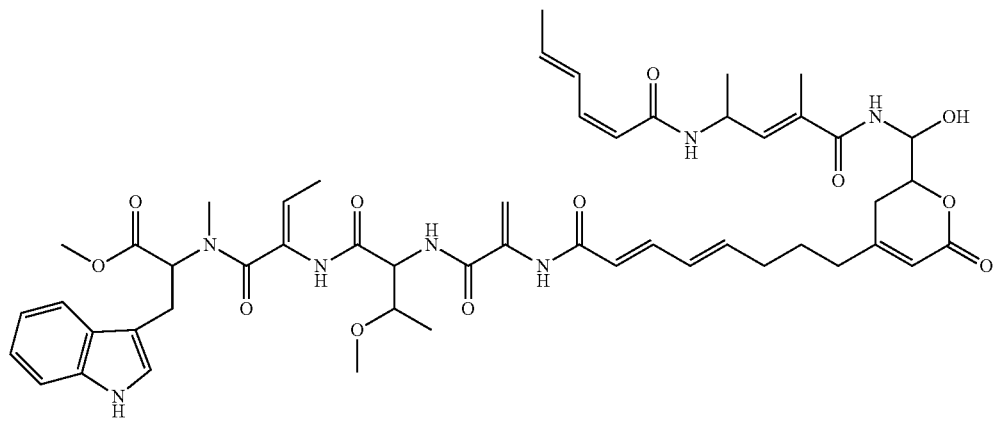

Hangtaimycin A (HTMA)

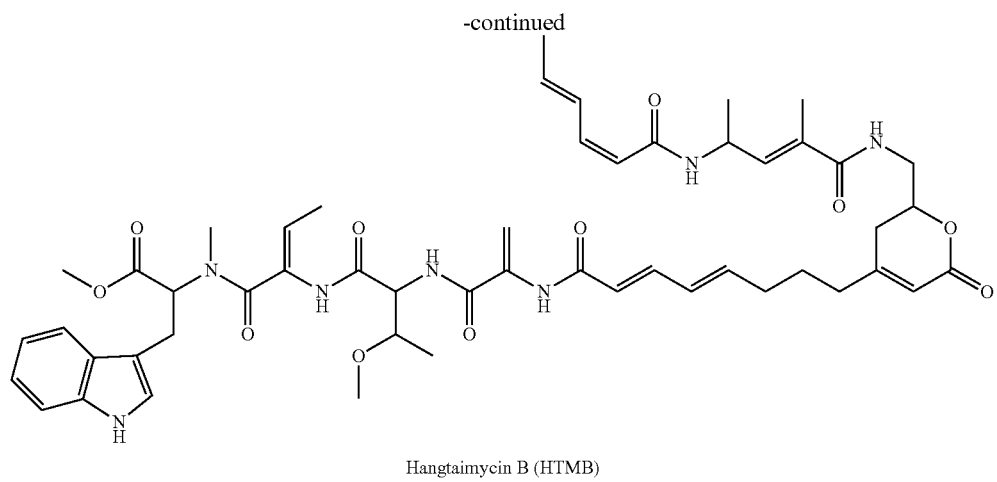

Hangtaimycin B (HTMB)

In the second aspect, the present invention provides a preparation method for HTM derivatives as described above, characterized in that the HTM derivatives include alcoholysis derivatives HTMA, HTMB, and HTMP, comprising the following steps:

S1: *Streptomyces spectabilis* CCTCC M2017417 or its genetically knockout strain uses SFMR medium for fermentation, which includes the following components: 2% soybean powder, 2% mannitol, and 5% AB-8 macroporous adsorption resin.

S2: Separate the fermentation products from step S1, extract them with ethyl acetate, and merge the extracts;

For the preparation of Deoxyhangtaimycin, chloroform/acetonitrile was used as the eluent, and gradient elution was performed from 100:0 to 50:50 by volume to collect the fraction eluted from a 70:30 to 50:50 gradient of chloroform/acetonitrile volume ratio.

For the preparation of HTMA and HTMB, the combined crude extracts were subjected to gradient elution using a chloroform methanol mixed solvent with a volume ratio of 100:0 to 90:10. The fraction eluted with a chloroform methanol volume ratio of 96:4 to 94:6 was collected.

S3: The fractions containing the target compounds of Deoxyhangtaimycin, Hangtaimycin A, or Hangtaimycin B were subjected to ODS reverse phase medium pressure liquid chromatography (S-50 μm, 12 nm, 26×300 mm, flow rate 13 mL/min), using acetonitrile/water as eluent for gradient elution (0:100 to 100:0 by volume):

When preparing Deoxyhangtaimycin, the fractions containing the target substance were finally subjected to high-performance liquid chromatography (ODS-A, 250×10 mm, 5 μm, YMC, flow rate of 3 mL/min) and eluted with a gradient of 45% to 55% acetonitrile water by volume fraction, and Deoxyhangtaimycin was prepared from the gene knockout mutant strain ΔhtmP, with a retention time of 20.8 min.

When preparing alcoholysis derivatives of HTMA or HTMB, each fraction obtained from a medium pressure chromatographic column is first detected by HPLC, and the components containing the target product are then dissolved in methanol, and alcoholysis is carried out at 42° C. and 0.1% acetic acid for 72 hours.

S4: The above alcoholysis products were detected by LC-ESI-HRMS after complete alcoholysis, and then subjected to high-performance liquid chromatography (ODS-A, 250×10 mm, 5 μm, YMC, flow rate of 3 mL/min) and prepared with gradient elution of acetonitrile from 45% to 55% by volume fraction in water. HTMA and HTMB were obtained from *Streptomyces spectabilis* CCTCC M2017417 and its gene knockout mutant strain ΔhtmP, respectively, with retention time of 18.8 minute and 21.2 minute, respectively.

3. Application of a HTM derivative in the preparation of anti-inflammatory, analgesic, anti-tumor, liver injury protection, and drug addiction prevention drugs.

Thirdly, the embodiment of the present invention provides an anti-inflammatory drug characterized in that it contains HTM, Deoxyhangtaimycin, HTMA, HTMB, and their derivatives as active ingredients as described above.

Fourthly, the embodiment of the present invention provides an analgesic drug characterized in that it is used for treating inflammatory pain and contains active ingredients such as HTM, Deoxyhangtaimycin, HTMA, HTMB, as well as their derivatives, as active ingredients for treating inflammatory pain.

In a fifth aspect, the embodiment of the present invention provides an anti-tumor drug characterized in that it is used for inhibiting tumor growth and treating tumors, containing HTM, Deoxyhangtaimycin, HTMA, HTMB, and their derivatives as active ingredients for tumor therapy, as described above.

In the sixth aspect, the embodiment of the present invention provides a liver injury protective drug, characterized in that it contains Deoxyhangtaimycin, HTMA, HTMB, and their derivatives as active ingredients as described above.

In a seventh aspect, the embodiment of the present invention provides a drug for preventing and treating drug addiction, characterized in that it is used for preventing and treating the addiction of morphine and cocaine drugs, and contains active ingredients such as HTM, Deoxyhangtaimycin, HTMA, HTMB, and their derivatives as active ingredients for preventing and treating drug addiction.

In the technical solution of the present invention, the fermentation culture of *Streptomyces spectabilis* CCTCC M2017417 or its cytochrome P450 encoding gene htmP in-frame knockout mutant strain ΔhtmP is filtered, and the fermentation product is extracted with ethyl acetate. The ethyl acetate phase is concentrated to prepare a concentrated extract. For the preparation of HTMA, *Streptomyces spectabilis* CCTCC M2017417 strain was used for fermentation, and for the preparation of HTMP and HTMB, the cytochrome P450 encoding gene htmP in-frame knockout mutant strain ΔhtmP was used for fermentation.

The concentrated extracts were further purified through methods of normal phase silica gel column chromatography, reverse phase medium pressure liquid chromatography, alcoholysis, high performance liquid chromatography, and to finally obtain HTMP, HTMA, and HTMB, respectively.

The embodiment of the present invention provides applications of HTM and its derivatives in anti-inflammatory, liver protective, analgesic, and treatment of morphine and cocaine addiction. Through activity testing experiments, the present invention shows that HTM derivatives have excellent bioactivities of anti-inflammatory, liver protective, analgesic, and therapeutic effects on morphine and cocaine addiction.

The *Streptomyces spectabilis* CCTCC M2017417 involved in the present invention is a known strain and is disclosed in literatures: (1) Functional analysis of cytochrome P450s involved in streptovaricin biosynthesis and generation of anti-MRSA analogues. Yuanzhen Liu, Xu Chen, Zhengyuan Li, Wei Xu, Weixin Tao, Jie Wu, Jian Yang, Zixin Deng, Yuhui Sun. *ACS Chemical Biology* 2017, 12(10): 2589-2597; (2) The mechanism of dehydrating bimodules in trans-acyltransferase polyketide biosynthesis: A showcase study on hepatoprotective Hangtaimycin. Minghe Luo, Houchao Xu, Yulu Dong, Kun Shen, Junlei Lu, Zhiyong Yin, Miaomiao Qi, Guo Sun, Lingjie Tang, Jin Xiang, Zixin Deng, Jeroen S. Dickschat, Yuhui Sun. *Angewandte Chemie International Edition* 2021, 60(35):19139-19143. The gene knockout mutant strain ΔhtmP was constructed by our research team through in-frame knockout of a cytochrome P450 gene based on *Streptomyces spectabilis* CCTCC M2017417. The gene knockout mutant strain ΔhtmP has been deposited in China Center for Type Culture Collection (hereinafter referred to as CCTCC, address: Wuhan University, Wuhan, China) on Jun. 13, 2022, with the classification name of *Streptomyces spectabilis* ΔhtmP and deposit number of CCTCC M2022874.

BRIEF DESCRIPTION OF DRAWINGS

Anti-liver injury activity of HTMA.

Anti-cholestasis activity of HTMA. FIG. 28A: Total bile acids, TBA; FIG. 28B: Direct bilirubin, DBIL; FIG. 28C: Total bilirubin, TBIL; FIG. 28D: γ-glutamyl transferase, GGT; FIG. 28E: Alkaline phosphatase, ALP. High (HH), medium (MH), low (LH) dose of HTMA; Obeticholic acid (OBC); Silymarin(S);

HE staining on rat liver tissue (FIG. 29A: control; FIG. 29B: model);

HE staining on rat liver tissue testing anti-liver injury activity of HTMA (FIG. 30A: model; FIG. 30B: OBC; FIG. 30C: S; FIG. 30D: LH; FIG. 30E: MH; FIG. 30F: HH);

Results of anti-inflammatory effects for HTM, HTMA, HTMB, and HTMP (FIG. 32A: Changes in thickness of inflammatory tissue swelling after administration of HTM.

DESCRIPTION OF EMBODIMENTS

The following is a further detailed explanation of the technical solution of the embodiment of the present invention in conjunction with examples and accompanying figures.

The gene knockout mutant strain ΔhtmP in the following examples has been deposited in the China Center for Type Culture Collection (CCTCC, address: Wuhan University, Wuhan, China) on Jun. 13, 2022, with the classification name of *Streptomyces spectabilis* ΔhtmP and the deposit number of CCTCC M2022874.

Figure 2:
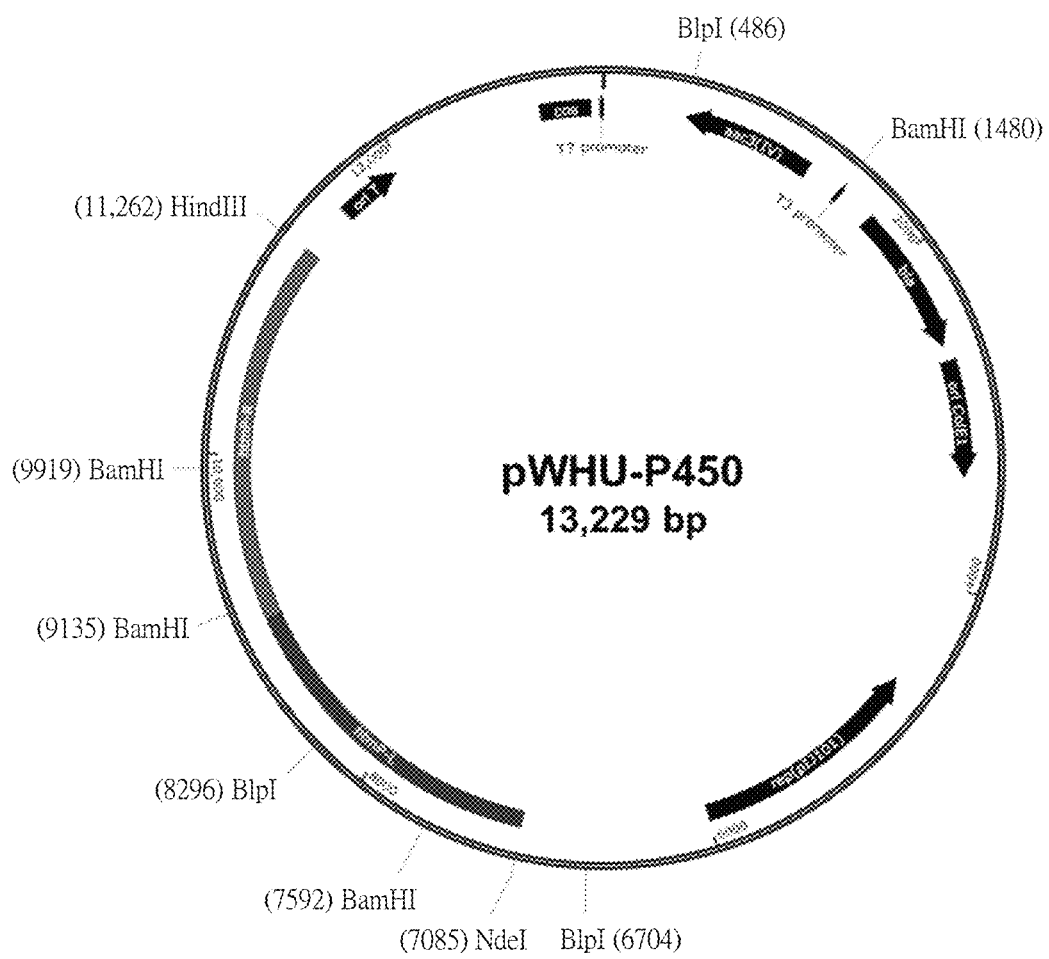
FIG. 2. Recombinant plasmid for the gene knockout mutant strain ΔhtmP construction.

Example 1. The Construction of the Gene Knockout Mutant Strain ΔhtmP (1) According to the nucleotide sequence of HTM biosynthetic gene cluster, two homologous recombination fragments of 1936 bp and 2236 bp were amplified by PCR using two pairs of primers (Table 1) designed, respectively, upstream and downstream of the cytochrome P450 encoding gene htmP in HTM biosynthetic gene cluster. The PCR reaction system and conditions are as following:

$dH_2O$, 48 μL
2×Phanta Max Buffer, 25 μL
dNTP Mix (10 mM each), 1 μL
Upstream primer (10 μM), 2 μL
downstream primer (10 μM), 2 μL
Phanta Max Super-Fidelity DNA Polymerase, 1 μL
Template DNA, 2 μL
95° C., 3 minutes
95° C., 30 seconds; 58° C., 30 seconds; 72° C., 90 seconds (30 cycles)
72° C., 5 minutes (2) The shuttle vector pYH7 of *Escherichia coli* and *Streptomyces* was digested with restriction endonucleases of NdeI and HindIII, and a DNA fragment about 9 kb containing the initial replication site of conjugation transfer and the ampicillin resistance gene were obtained as vectors. The two homologous arms were spliced with Gibson method to obtain the htmP in-frame knockout recombinant plasmid pWHUP450 (FIG. 2).

(3) The recombinant plasmid pWHUP450 was transferred into *E. coli* DH10B and cultured overnight at 37° C. Selected positive monoclonal clones of the plate were extracted for plasmids, and performed enzyme digestion and sequencing verification.

(4) The verified correct recombinant plasmid pWHUP450 was transferred into *E. coli* ET12567/pUZ8002 strain. The *E. coli* ET12567/pUZ8002 monoclonal transformant containing the recombinant plasmid were inoculated into 5 mL 2×TY liquid culture medium (tryptone 1.6%, yeast extract 1%, 0.5% NaCl) contained kanamycin (50 μg/mL) and apramycin (25 μg/mL). After overnight cultivation at 37° C., they were further inoculated with 10% inoculum to 5 mL 2×TY culture medium containing antibiotic kanamycin (25 μg/mL) and apramycin (12.5 μg/mL) and incubate at 37° C. for another 3 hours.

(5) After incubation in TSBY liquid medium (sucrose 10.5%, yeast extract 0.5%, soybean extract 0.5%) for 48 hours, the mycelium of *Streptomyces spectabilis* CCTCC M2017417 were washed with 2×TY liquid culture medium twice, also *E. coli* ET12567/pUZ8002 cell containing recombinant plasmid were washed twice with 2×TY liquid medium, then 100 μL mycelium and 100 μL *E. coli* ET12567/pUZ8002 were mixed well and applied on ABB13 solid culture medium (soluble starch 0.5%, soy peptone 0.5%, calcium carbonate 0.3%, 3-(N-morpholine) propionic acid 0.21%, thiamine hydrochloride 0.001%, ferrous sulfate heptahydrate 0.0012%, agar 2%). After incubation at 28° C. for 12 hours, 1 mL of antibiotic containing nalidixic acid (25 g/mL) and apramycin (35 μg/mL) were added on the surface of the culture medium. After this, the stain was cultured on 28° C. for 5~7 days, then the conjugated transfer could be observed.

(6) Obtained conjugated transfers were conduct relaxation culture at 28° C. onto the ABB13 solid medium. After 5~7 days, obvious single colony could be observed.

Figures 3A, 3B:
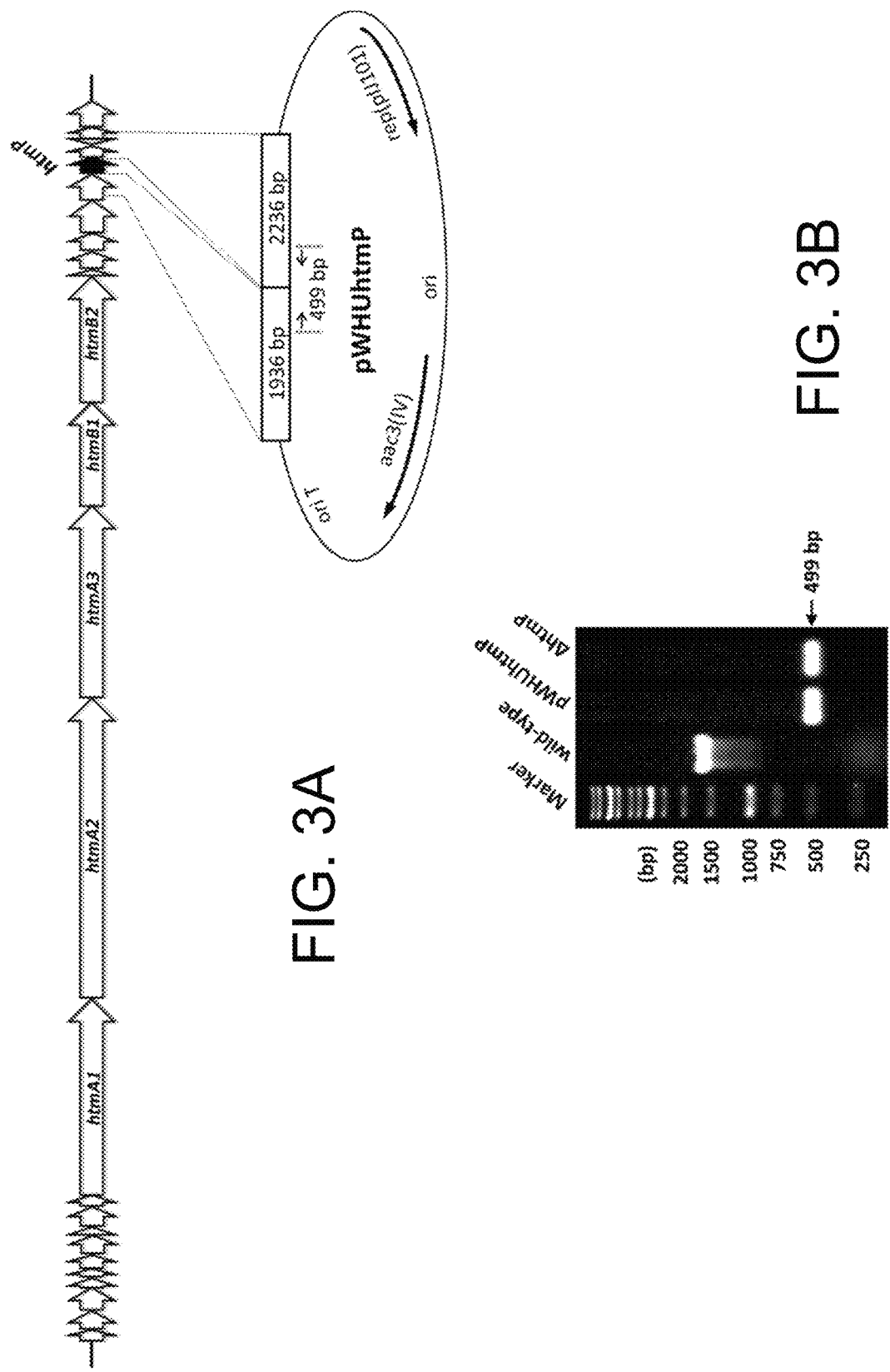
FIG. 3A and FIG. 3B. Schematic diagram and validation result of the gene knockout mutant strain ΔhtmP construction.
Figure 4A:
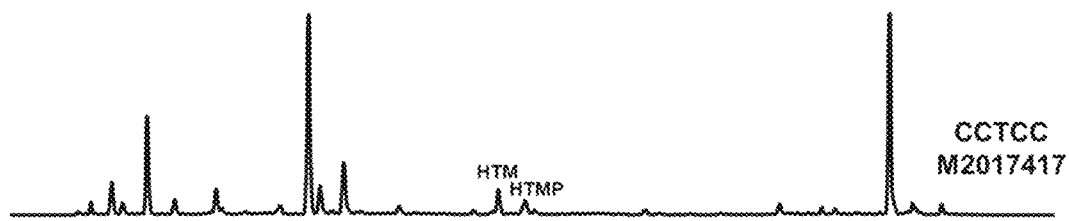
FIG. 4A, FIG. 4B, FIG. 4C and FIG. 4D. HPLC results of the fermentation extracts of the gene knockout mutant strain ΔhtmP (* means no HTM was detected by HPLC)
Figure 4B:
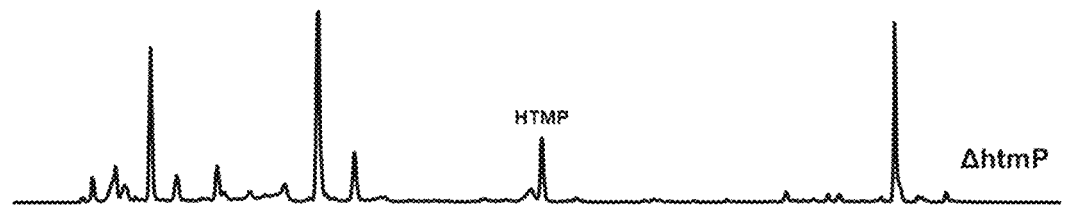
Figure 4C:
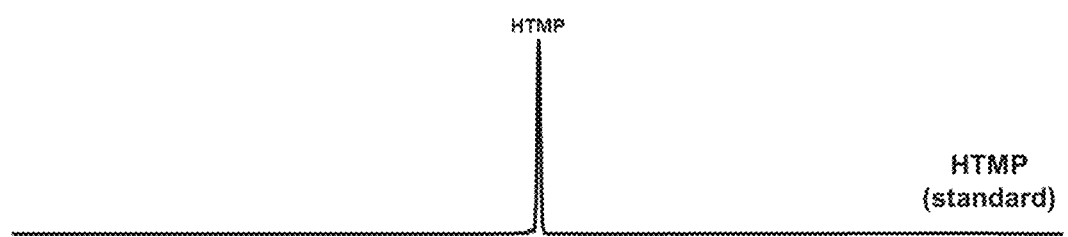
Figure 4D:
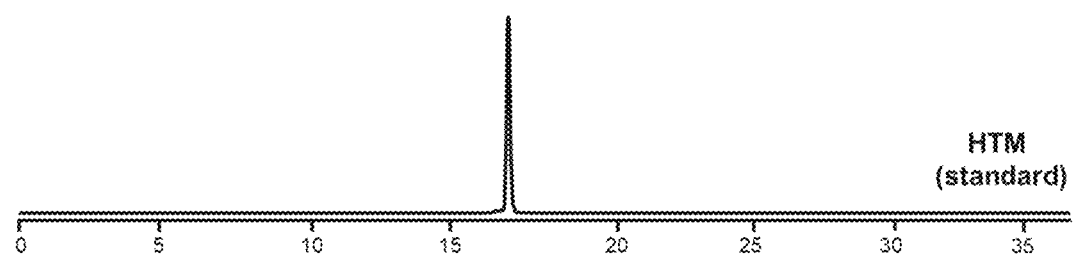
Figure 5:
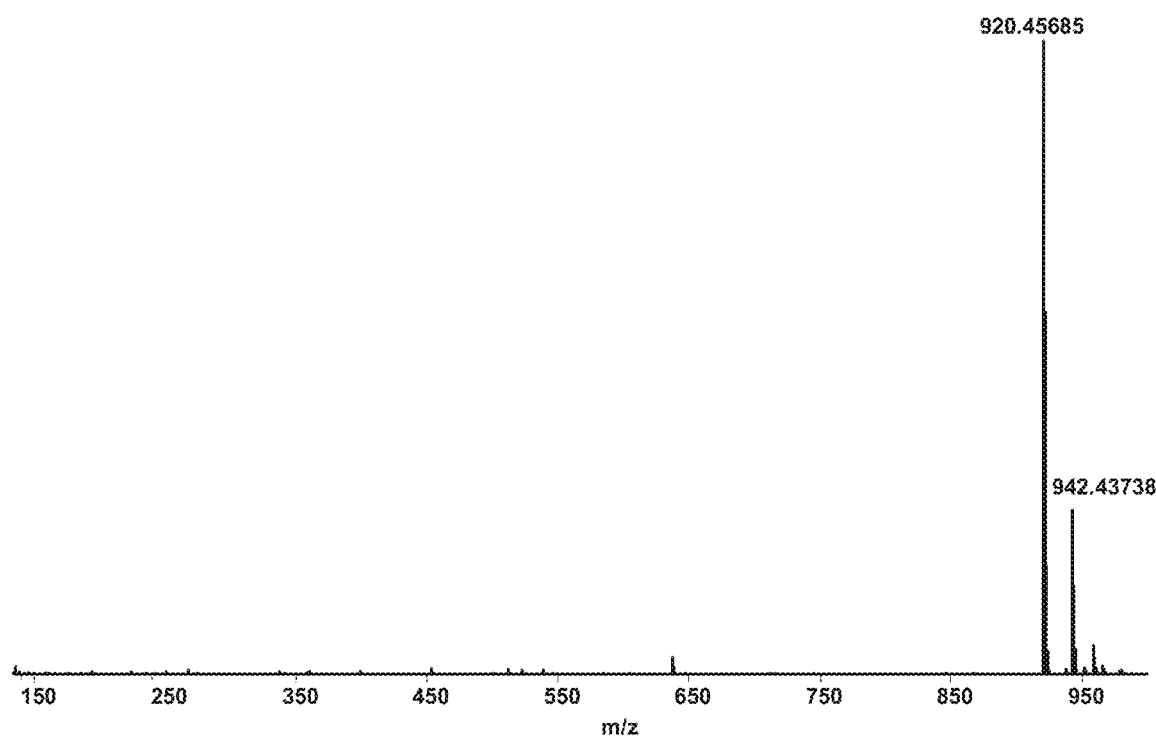
FIG. 5. ESI-HRMS spectrum of HTMP.
Figure 6:
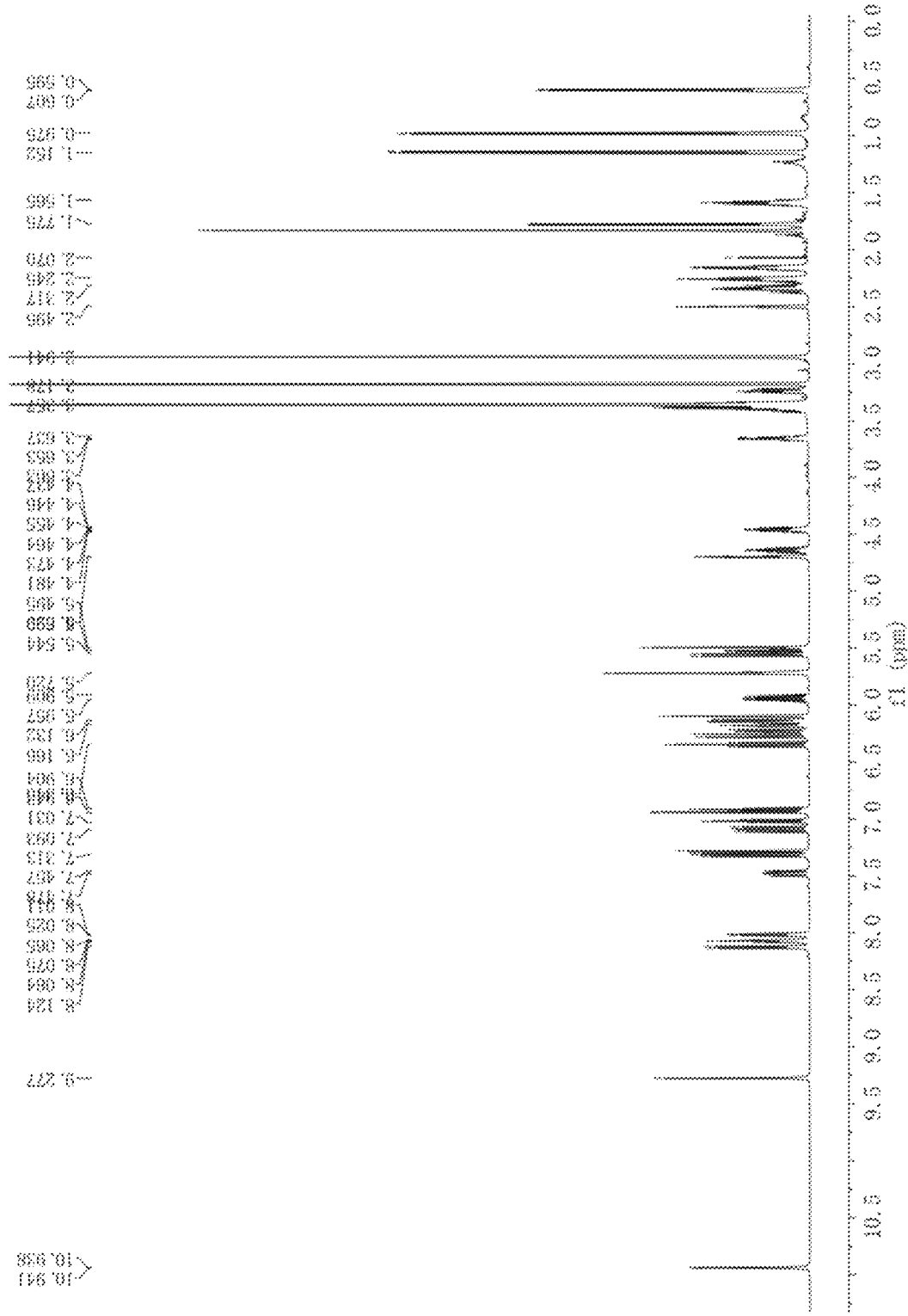
FIG. 6. $^1$H NMR spectrum of HTMP.
Figure 7:
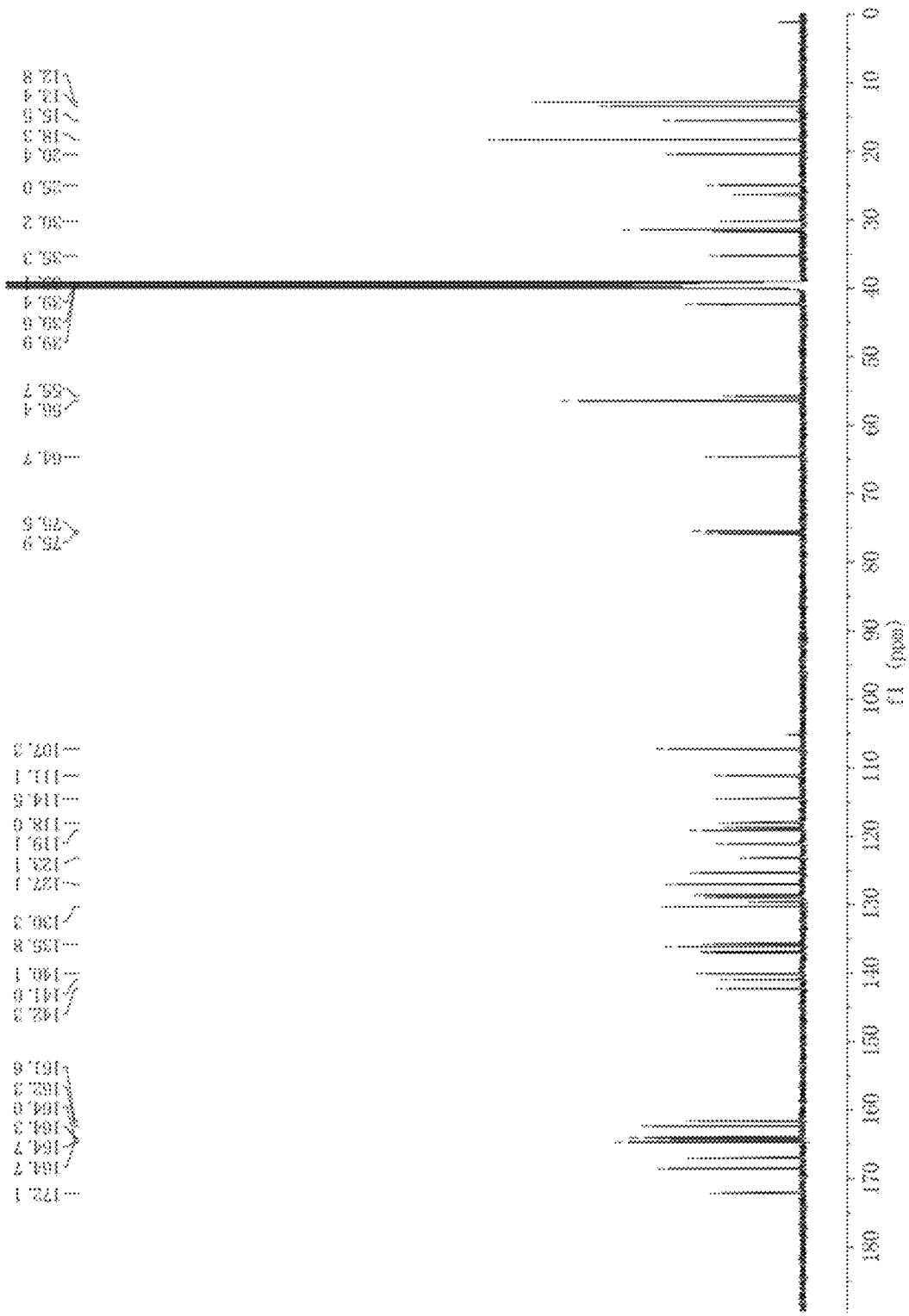
FIG. 7. $^{13}$C NMR spectrum of HTMP.
Figure 8:
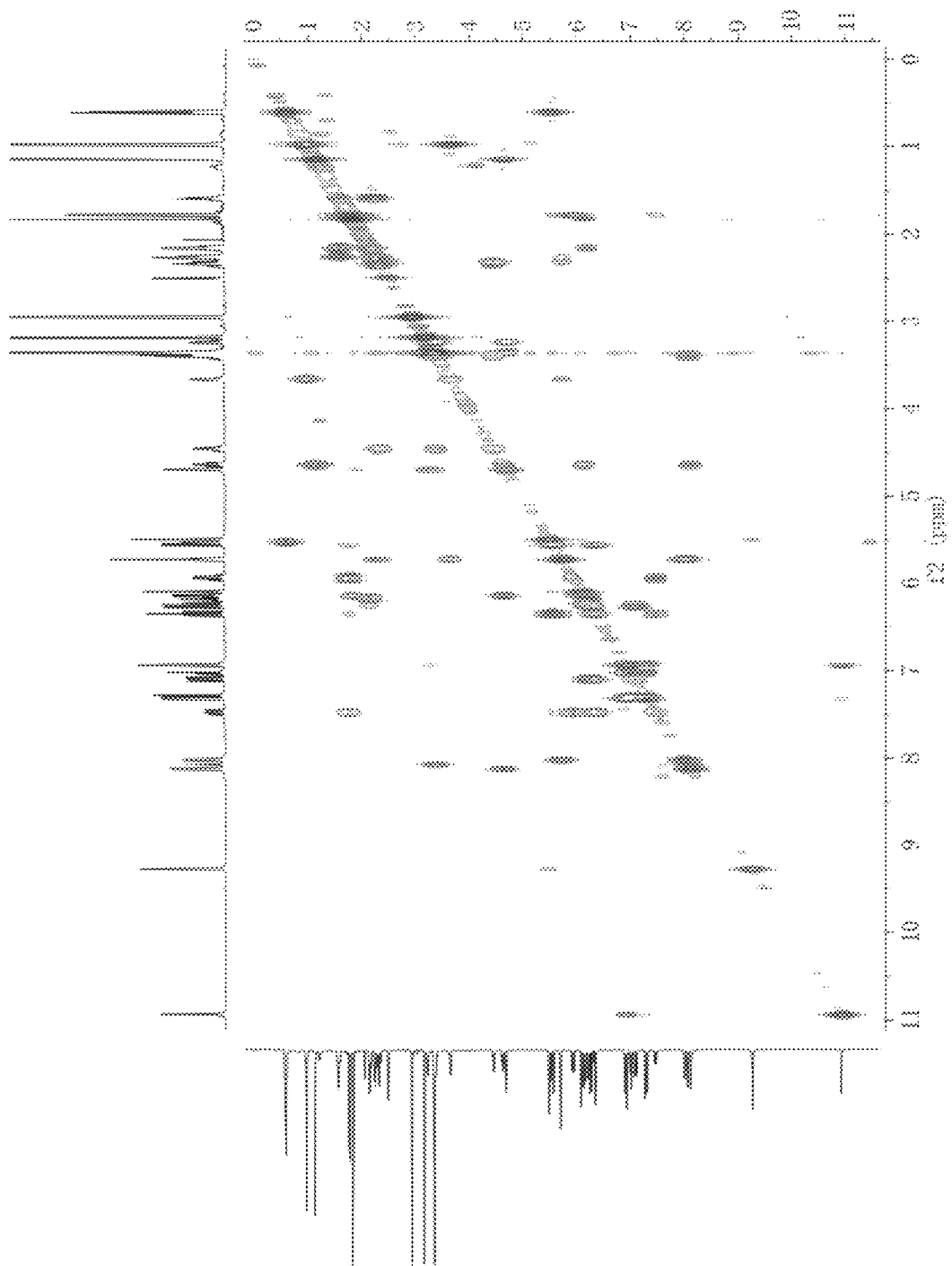
FIG. 8. $^1$H-$^1$H COSY spectrum of HTMP.
Figure 9:
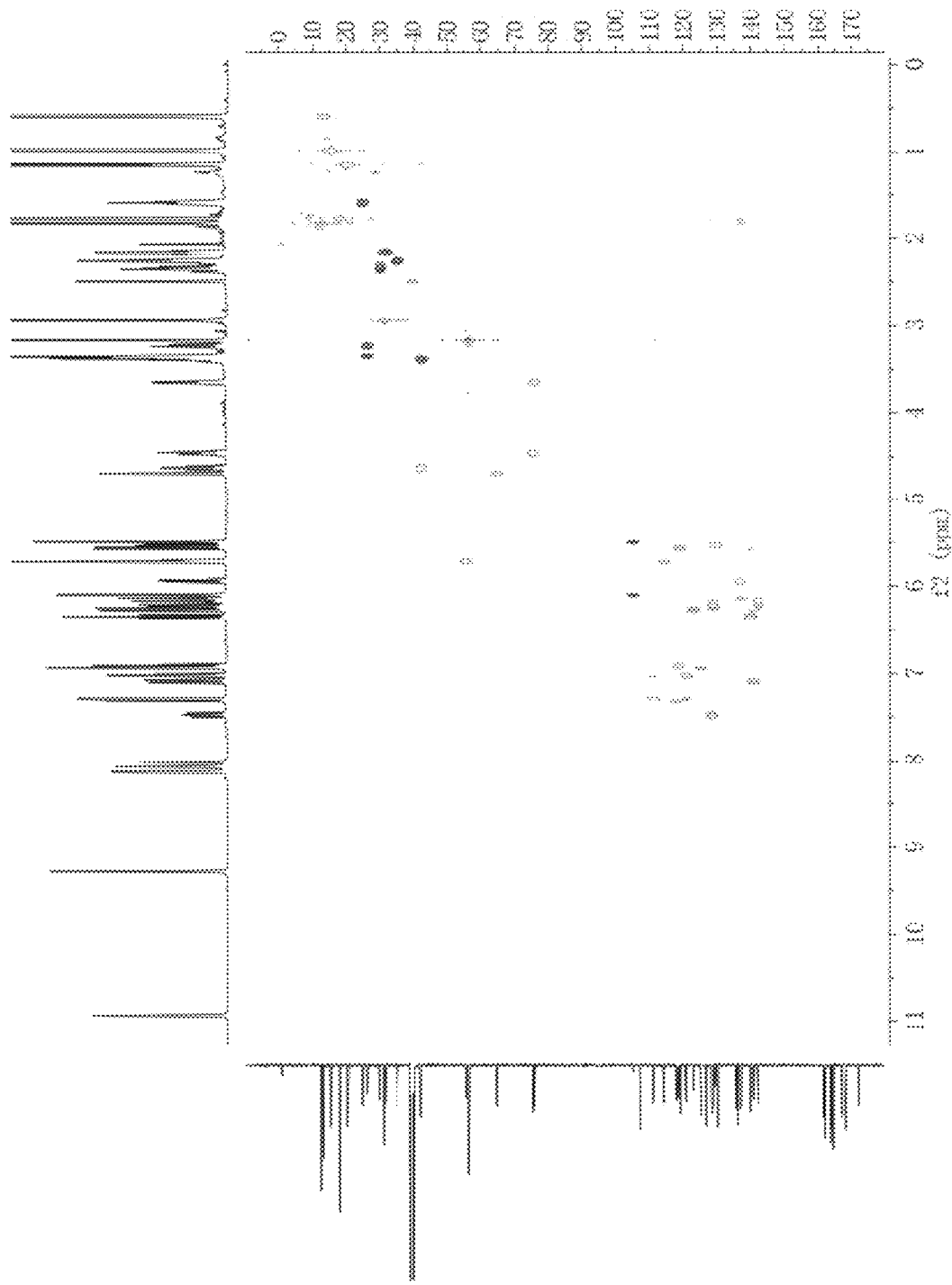
FIG. 9. HSQC spectrum of HTMP.
Figure 10:
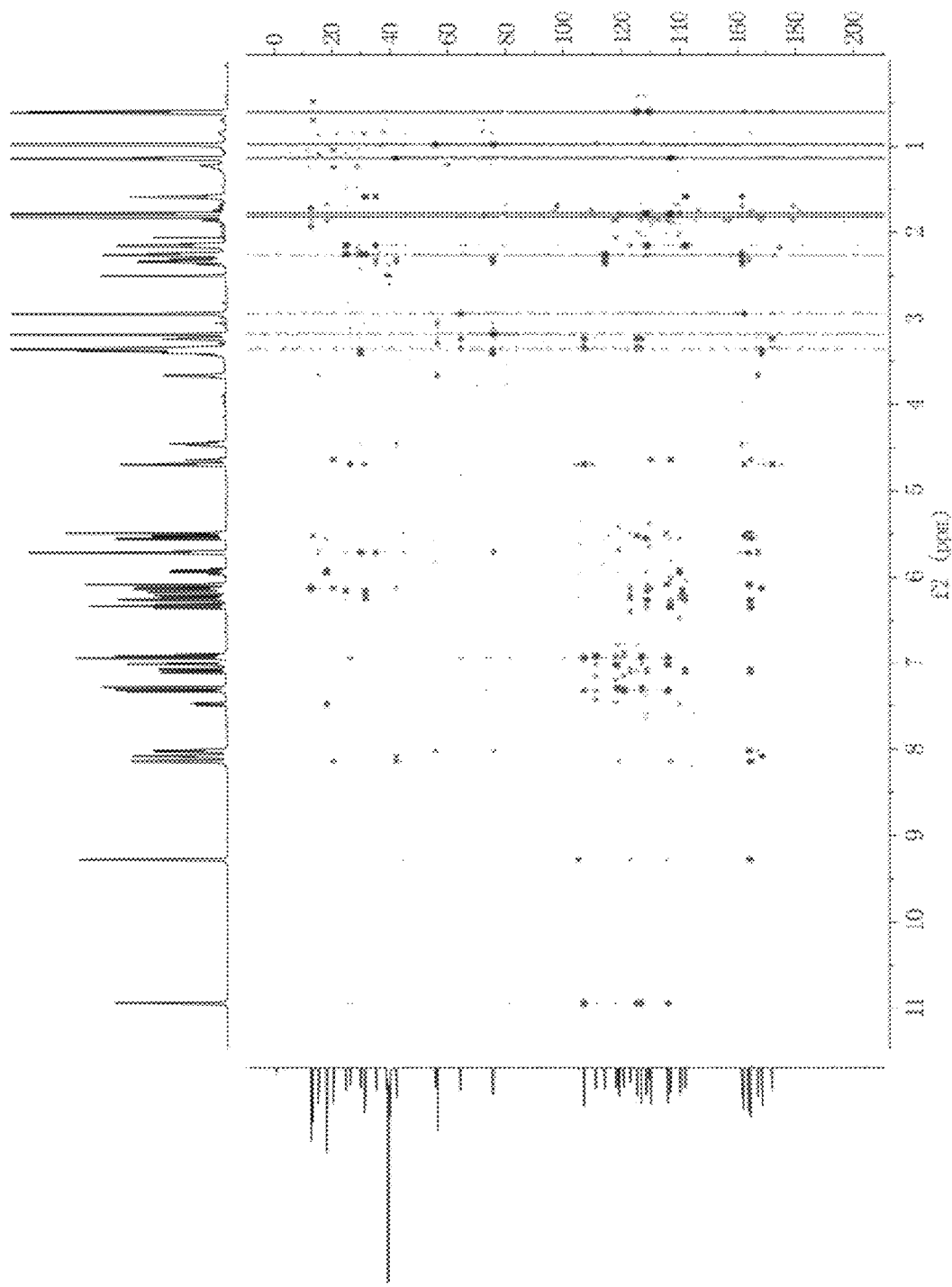
FIG. 10. HMBC spectrum of HTMP.
Figure 11:
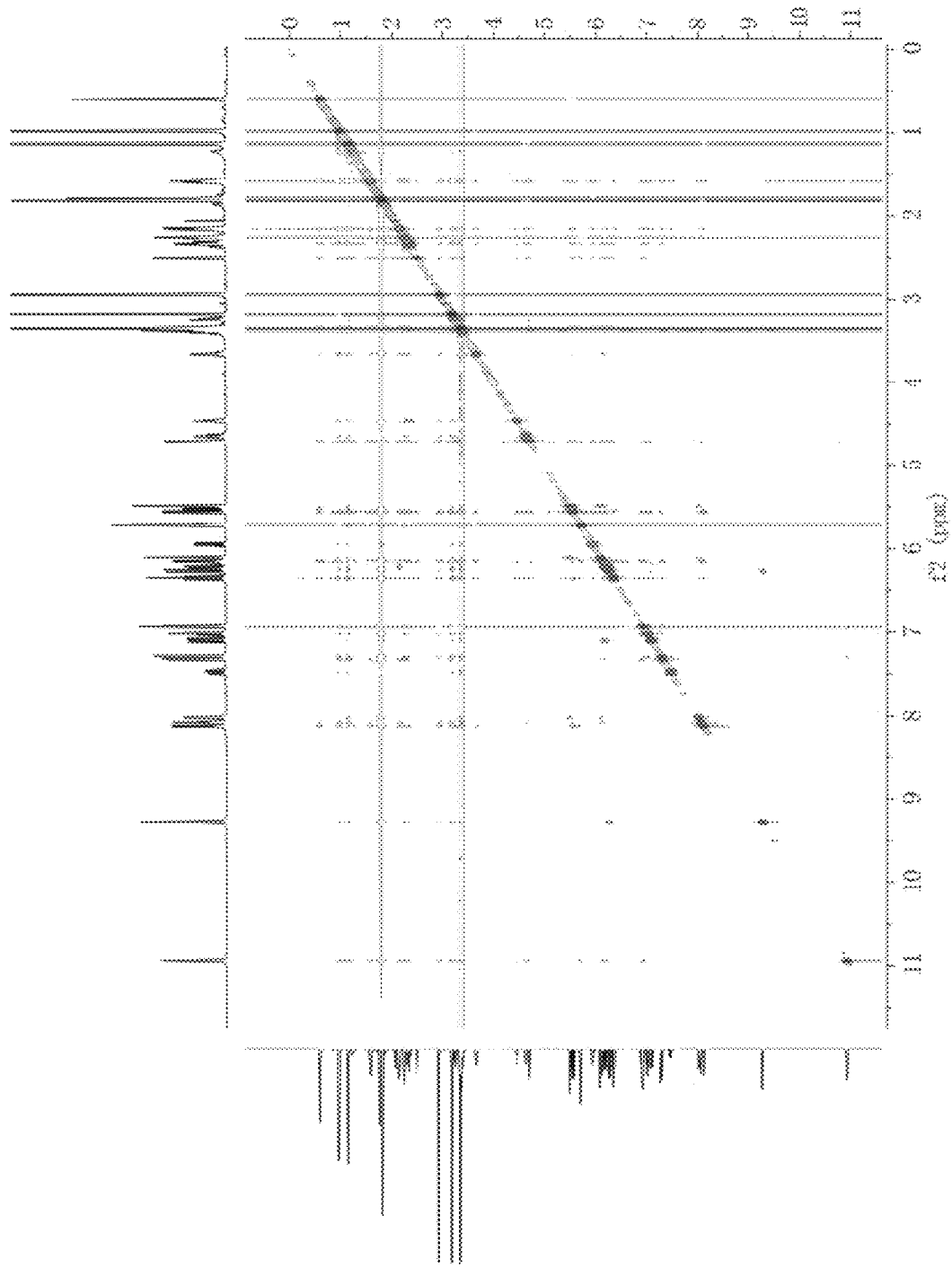
FIG. 11. $^1$H-$^1$H ROESY spectrum of HTMP.

(7) The single bacterial colonies were separately cultured to the ABB13 solid medium plates containing the antibiotic apramycin (35 μg/ml) and no antibiotics simultaneously. The strains that grow on plates on no antibiotics plates but do not grow on plates containing antibiotic apramycin after 5~7 days were the candidate target strains, and their genomic DNA were extract, and then perform PCR validation with the design primers (upstream and downstream regions of the knockout DNA) (Table 2). The verified correct strain is named as ΔhtmP (FIG. 3A and FIG. 3B).

TABLE 1

Primer and nucleotide sequence for construction htmP in-frame knockout recombinant plasmid

| Primers | Nucleotide sequence (5'-3') | Number |
| --- | --- | --- |
| P450-P-L-up | TCAAGGCGAATACTTCATATGGTCCTCAACCGCACCGAGTACACCC | SEQ 1 |
| P450-P-L-Re | CAACCCCTTCACCTGGAACGGCCGCATCAACG | SEQ 2 |
| P450-P-R-up | CGTTCCAGGTGAAGGGGTTGAACAGCGGTATCTGC | SEQ 3 |
| P450-P-R-Re | GACCTGCAGGCATGCAAGCTTCCGTGATCGTGCGGTACGTGAGGT | SEQ 4 |

TABLE 2

Primers and nucleotide sequences for verification of htmP in-frame knockout mutant strain

| Primers | Nucleotide sequence (5'-3') | Number |
| --- | --- | --- |
| P450-P-confirm-up | CGGCTCCTTCGTCAACTTCCT | SEQ 5 |
| P450-P-confirm-re | CTCCTGCTCTCATCCTGGTCAC | SEQ 6 |

Example 2. Efficient Preparation Method for HTMP (1) Fermentation

1) The htmP in-frame knockout mutant strain (ΔhtmP) were cultured on the ABB13 solid culture medium plates. Firstly, taken approximately a size of 1 cm² cultured stain on the ABB13 solid culture medium plate into 200 mL TSBY liquid medium and incubate at 28° C. and 220 rpm for 20 hours to prepare seed solution.

2) Inoculate the above seed liquid with 2% inoculation amount into 10 L SFMR fermentation medium, and further incubated at 28° C. and 220 rpm for 4 days to prepare a fermentation medium.

(2) Extraction

1) The fermentation broth and the mycelium and macroporous resin were separated through a sieve (100-200 mesh).

2) The mycelium and macroporous resin were extracted three times with 8 L ethyl acetate, and the ethyl acetate phase was combined and subjected to vacuum distillation concentration to obtain approximately 7.8 g of extract.

(3) Separation

1) The concentrated extracts were subjected to normal phase silica gel column chromatography, with chloroform/acetonitrile as the eluent. Gradient elution was performed from 100:0 to 50:50 by volume, and the fraction eluted with chloroform/acetonitrile in a volume ratio of 70:30 to 50:50 was collected.

2) The above fractions containing the target substance are then subjected to ODS reverse phase medium pressure liquid chromatography (S-50 μm, 12 nm, 26×300 mm, flow rate 13 mL/min), gradient elution from 0:100 to 100:0 by volume was conducted with acetonitrile/water eluent.

3) The above fractions containing the target substance were finally subjected to high-performance liquid chromatography (ODS-A, 250×10 mm, 5 μm, YMC, flow rate of 3 mL/min) and eluted with acetonitrile in a gradient of 45% to 55% volume fraction, and collected compound with a retention time at 20.8 minute.

(4) Identification

The high-resolution mass spectrometry results of the compound obtained from ΔhtmP, showed that the molecular weight of this intermediate ($C_{50}H_{61}N_7O_{10}$), which was only one oxygen atom less than that of HTM ($C_{50}H_{61}N_7O_{11}$). By comparing and analyzing the nuclear magnetic spectrum data, it was found that the hypomethoxy nuclear magnetic resonance signal of HTM $\delta_H$ 5.36, dd (13.2, 7.2) and $\delta_C$ 73.4 is replaced with a methylene nuclear magnetic resonance signal of $\delta_H$ 3.39, dd (13.2, 7.2) and $\delta_C$ 42.5 in this intermediate, suggesting that it should be a methylene group at the C-42 methoxy position relative to HTM and identified as HTMP (Table 3).

TABLE 3

$^{13}C$ and $^1H$ NMR data of HTMP

| Position | HTMP $\delta_H$, multi. (J in Hz) | $\delta_C$, type |
| --- | --- | --- |
| 1 | 10.9, brs | |
| 2 | 6.9, d (2.4) | 125.3, CH |
| 3 | | 107.3, C |
| 4 | 7.32, d (8.4) | 118.0, CH |
| 5 | 6.92, t (7.2) | 118.7, CH |
| 6 | 7.02, t (7.2) | 121.1, CH |
| 7 | 7.29, d (8.4) | 111.2, CH |
| 8 | | 136.2, C |
| 9 | | 127.1, C |
| 10 | 3.23, m; 3.35, m | 26.4, $CH_2$ |
| 11 | 4.7, dd (4.8, 4.2) | 64.8, CH |
| 12N—$CH_3$ | 2.94, s | 31.4, $CH_3$ |
| 13 | | 162.3, C |
| 14 | | 125.3, C |
| 16 | | 172.1, C |
| 17 | 5.52, q (7.2) | 129.8, CH |
| 18 | 0.6, d (7.2) | 13.4, $CH_3$ |
| 19 | | 167, C |
| 20 | 5.71, dd (8.4, 3.6) | 55.8, CH |
| 21 | 3.66, m | 75.9, CH |
| 21—$OCH_3$ | 3.18, s | 56.4, $CH_3$ |
| 22 | 0.98, d (6.0) | 15.5, $CH_3$ |
| 23 | 8.02, d (8.4) | |
| 24 | | 164.3, C |
| 25 | | 135.8, C |
| 26 | 5.5, s, 6.10 s | 105.9, $CH_2$ |
| 27 | 9.28, s | |
| 28 | | 164.7, C |
| 29 | 6.27, d (15.0) | 123.2, CH |
| 30 | 7.09, dd (15.0, 10.2) | 141.0, CH |
| 31 | 6.22, (overlap) | 128.9, CH |
| 32 | 6.18, dt (15.0, 6.6) | 142.3, CH |
| 33 | 2.16, q (7.2) | 31.7, $CH_2$ |
| 34 | 1.59, m | 25.0, $CH_2$ |
| 35 | 2.26, t (7.2) | 35.3, $CH_2$ |
| 36 | | 164.0, CH |
| 37 | 2.34, (overlap) | 30.3, $CH_2$ |
| 38 | 4.46, m | 75.5, CH |
| 40 | | 161.6, C |
| 41 | 5.72, s | 114.5, CH |
| 42 | 3.39, dd (13.2, 7.2) | 42.5, $CH_2$ |
| 43 | 8.07, d (7.2) | |
| 44 | | 168.6, C |
| 45 | | 130.3, C |
| 46 | 1.83, s | 12.8, $CH_3$ |
| 47 | 6.14, d (9.0) | 137.1, CH |
| 48 | 4.64, m | 42.4, CH |
| 49 | 1.15, d (6.6) | 20.4, $CH_3$ |
| 50 | 8.13, d (8.4) | |
| 51 | | 164.6, C |
| 52 | 5.56, d (11.4) | 119.3, CH |
| 53 | 6.35, t (11.4) | 140.1, CH |
| 54 | 7.48, dd (14.4, 12.0) | 128.6, CH |
| 55 | 5.94, m | 137.1, CH |
| 56 | 1.78, d (6.6) | 18.3, $CH_3$ |

Example 3 Efficient Preparation Method for HTMA and HTMB (1) Fermentation

1) *Streptomyces spectabilis* CCTCC M2017417 (for the preparation of HTMA) and its gene knockout mutant strain ΔhtmP (for the preparation of HTMB), were cultured on the ABB13 solid culture medium plates. Firstly, a size of 1 cm² cultured stain on the ABB13 solid culture medium plate were transferred into 200 mL TSBY liquid medium and incubate at the condition of 28° C. and 220 rpm for 36 hours to prepare seed solution.

2) Inoculate the above seed liquid with 2% inoculation amount into 10 L SFMR fermentation medium, and further incubated at 28° C. and 220 rpm for 108 hours to prepare a fermentation medium.

(2) Extraction

1) The fermentation broth and the mycelium and macroporous resin were separated through a sieve (100-200 mesh).

2) The mycelium and macroporous resin were extracted with 10 L ethyl acetate three times, and the ethyl acetate phase was combined and subjected to vacuum distillation concentration to obtain approximately 8.4 g of extract.

(3) Separation

1) The concentrated extract was subjected to normal phase silica gel column chromatography, with chloroform/methanol as the eluent. Gradient elution was performed from 100:0 to 80:20 (chloroform/methanol) by volume, and the fraction eluted with chloroform/methanol in a volume ratio of 96:4 to 94:6 was collected.

2) The above fractions containing the target substance are then subjected to ODS reverse phase medium pressure liquid chromatography (S-50 μm, 12 nm, 26×300 mm, flow rate 13 mL/min), using acetonitrile/water as eluent, gradient elution was performed from 0:100 to 100:0 (acetonitrile/water) by volume. The group containing the target substance was detected by HPLC and then dissolved in methanol, and alcoholized at 42° C. and 0.1% acetic acid for 72 hours.

3) The above fractions were finally subjected to high performance liquid chromatography (ODS-A, 250×20 mm, 5 μm, YMC, flow rate of 3 mL/min) and eluted with a gradient of 45% to 55% (acetonitrile/water by volume). The retention times of 18.8 minute (HTMA) and 21.2 minute (HTMB) were prepared from *Streptomyces spectabilis* CCTCC M2017417 and ΔhtmP respectively.

(4) Identification

Figure 1:
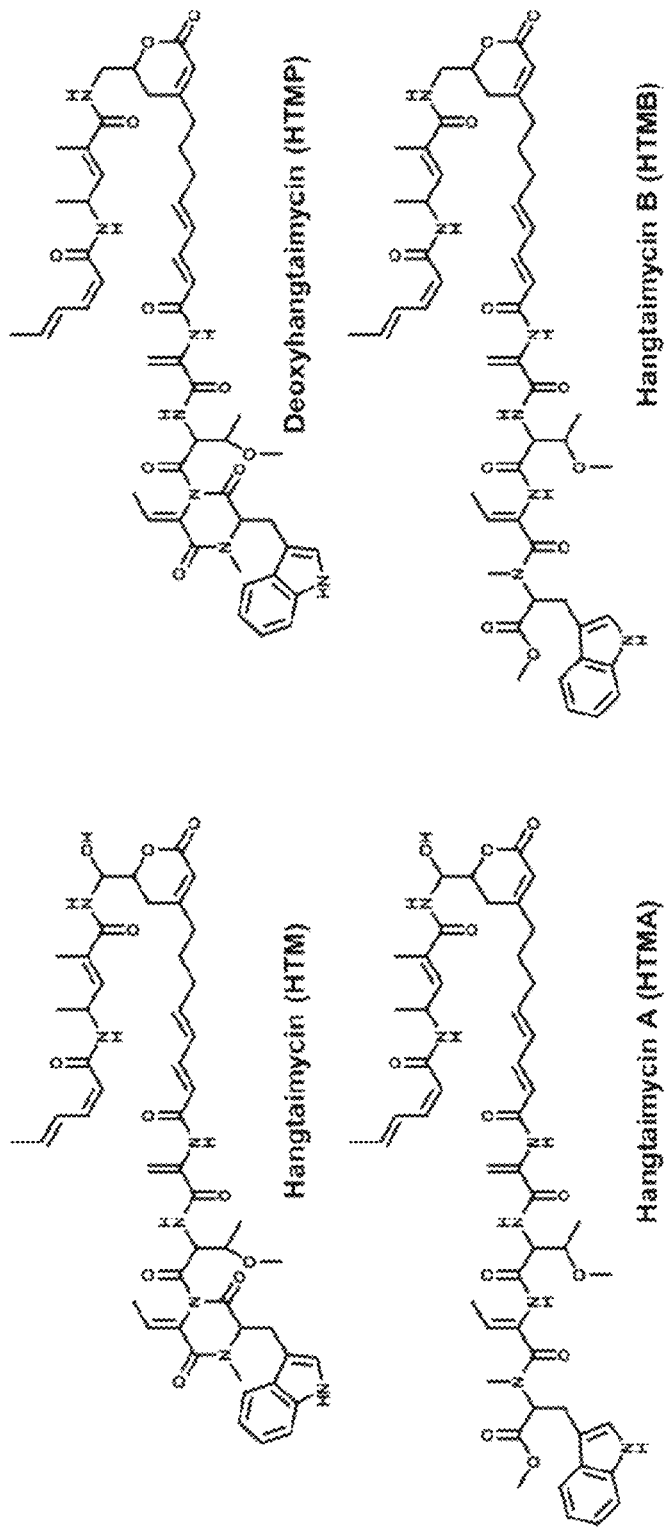
FIG. 1. The chemical structural formula of HTM and its alcoholysis derivatives (HTM and HTMP: HTM derivatives, HTMA and HTMB: HTM alcoholysis derivatives)
Figure 12:
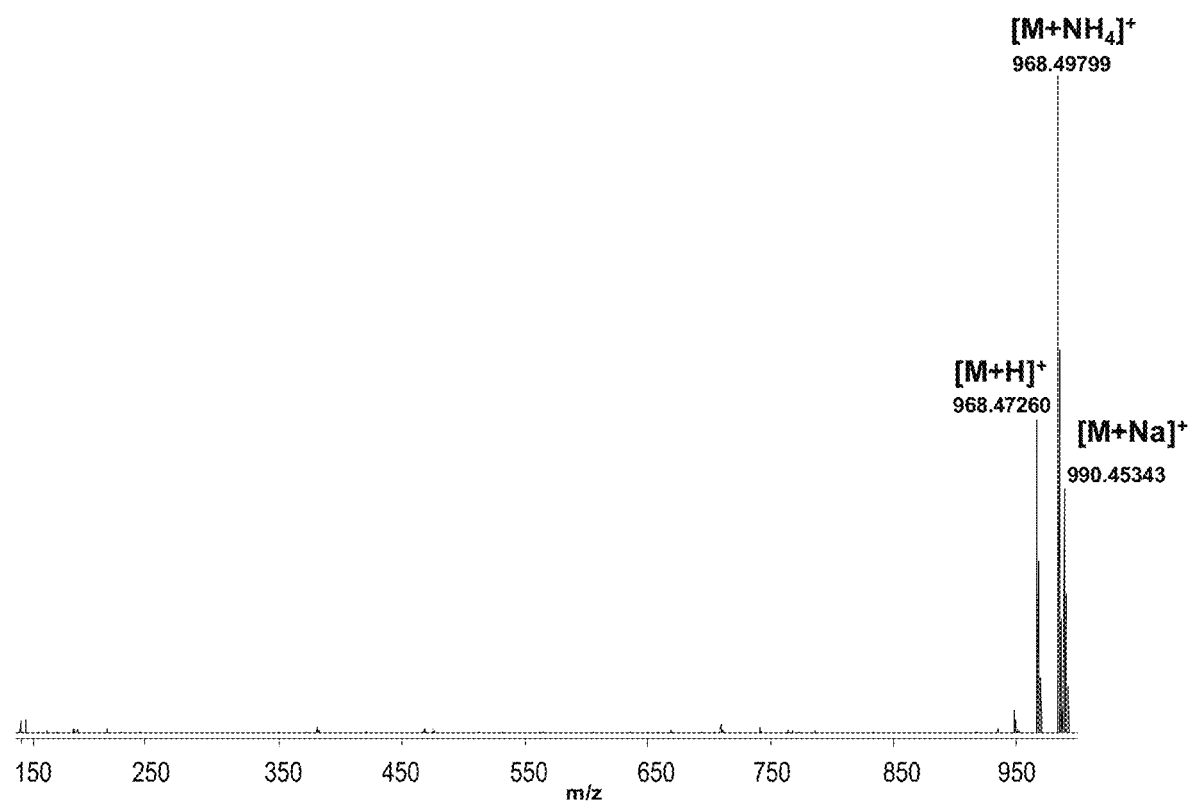
FIG. 12. ESI-HRMS spectrum of HTMA.
Figure 13:
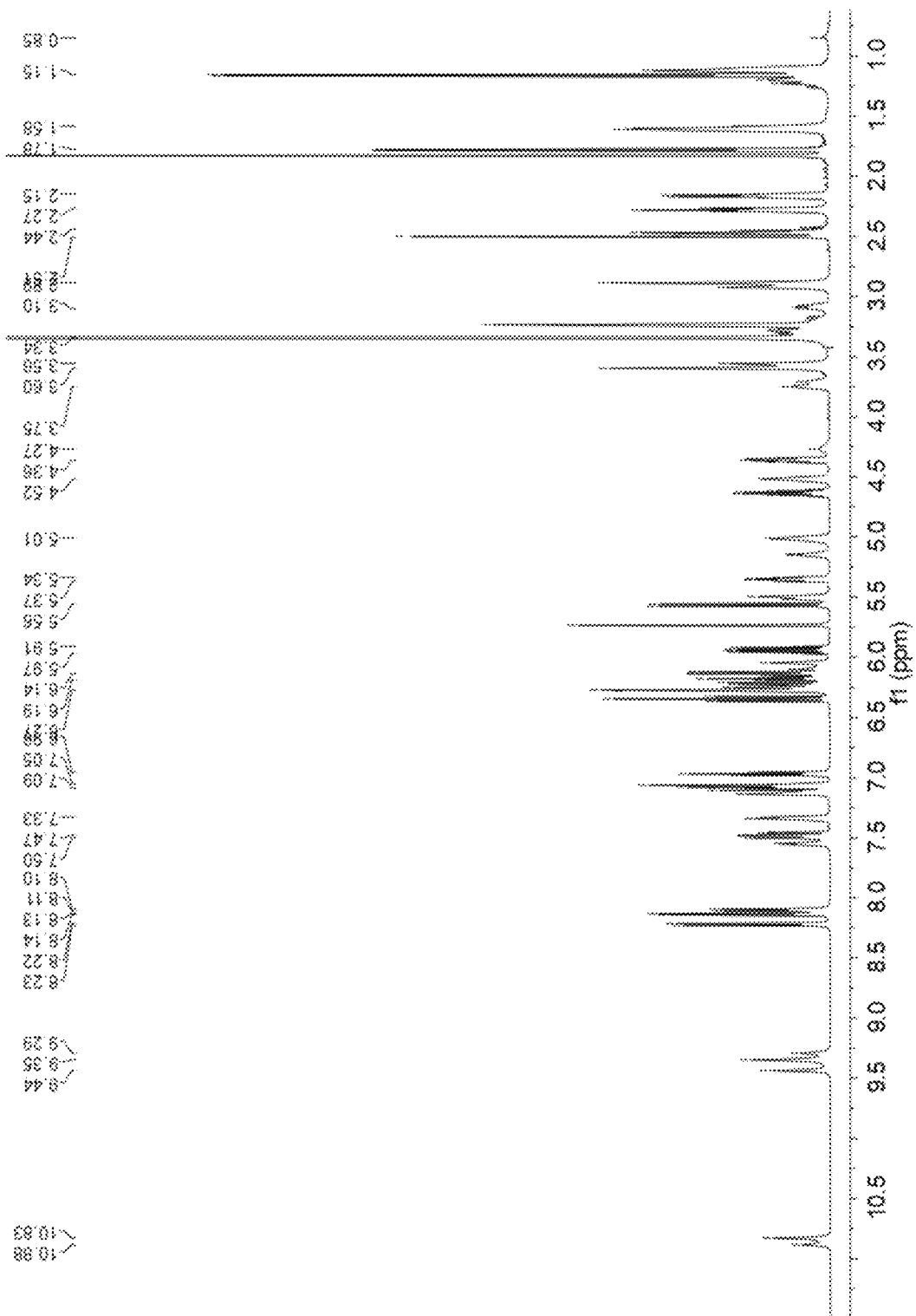
FIG. 13. $^1$H NMR spectrum of HTMA.
Figure 14:
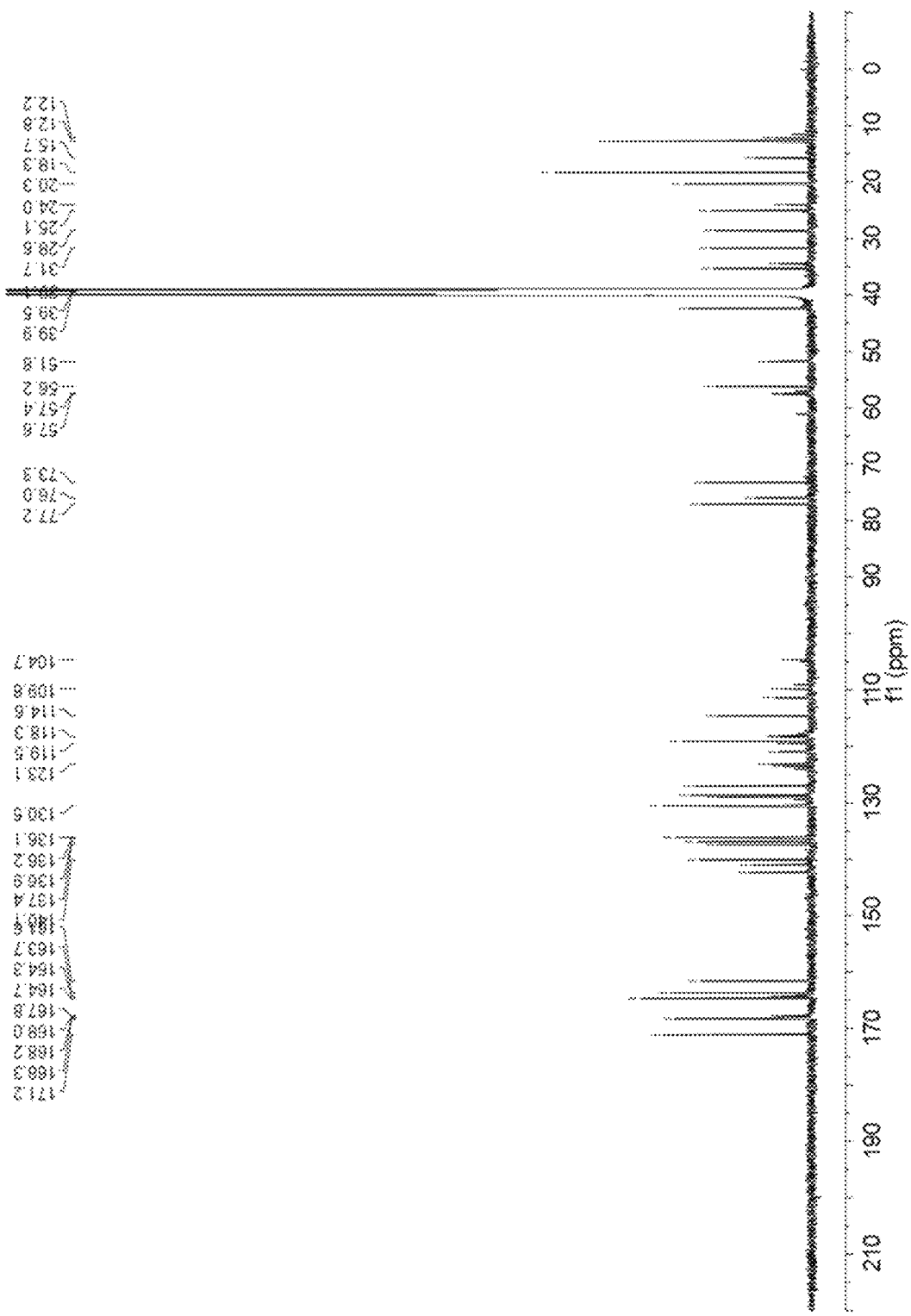
FIG. 14. $^{13}$C NMR spectrum of HTMA.
Figure 15:
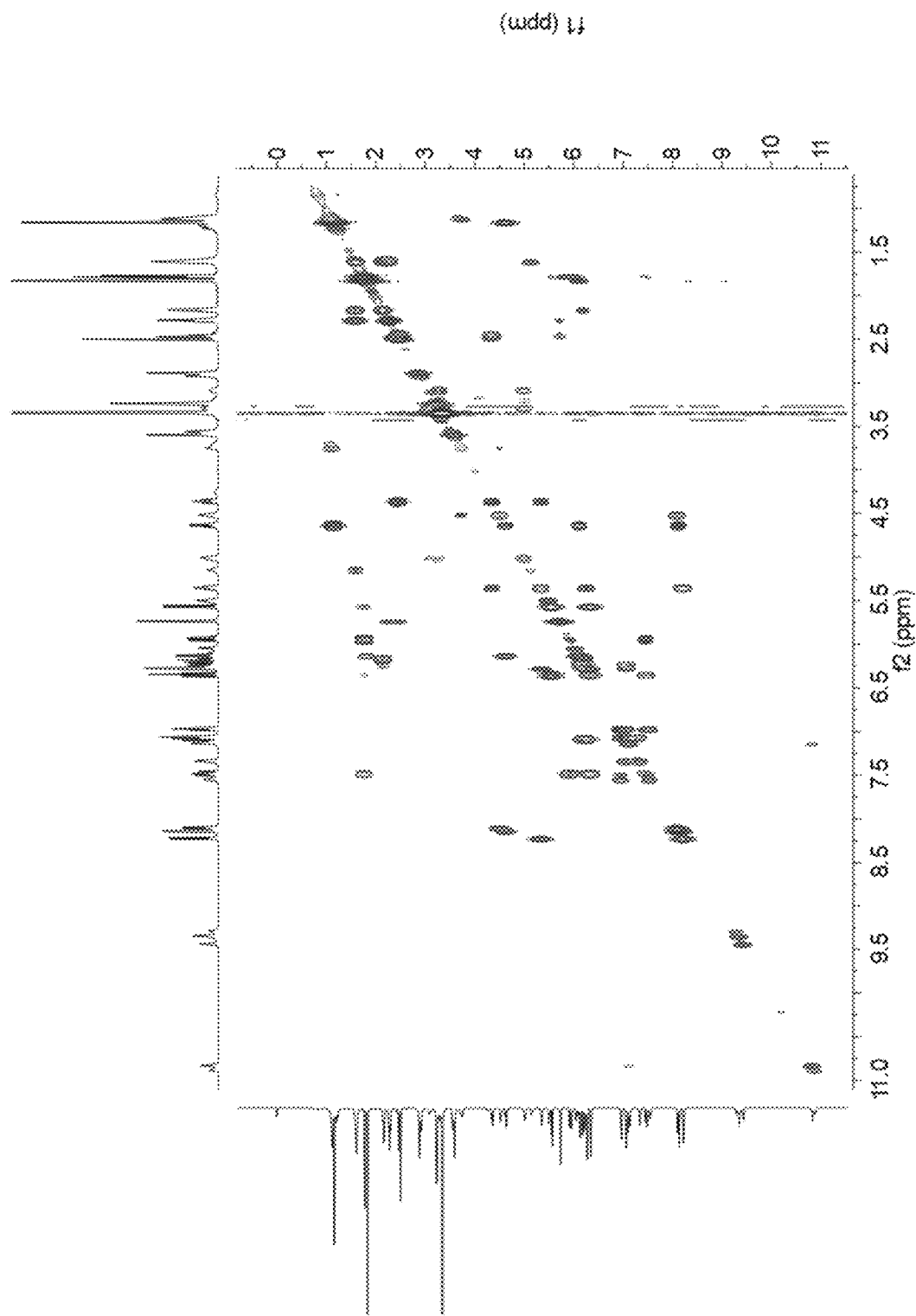
FIG. 15. $^1$H-$^1$H COSY spectrum of HTMA.
Figure 16:
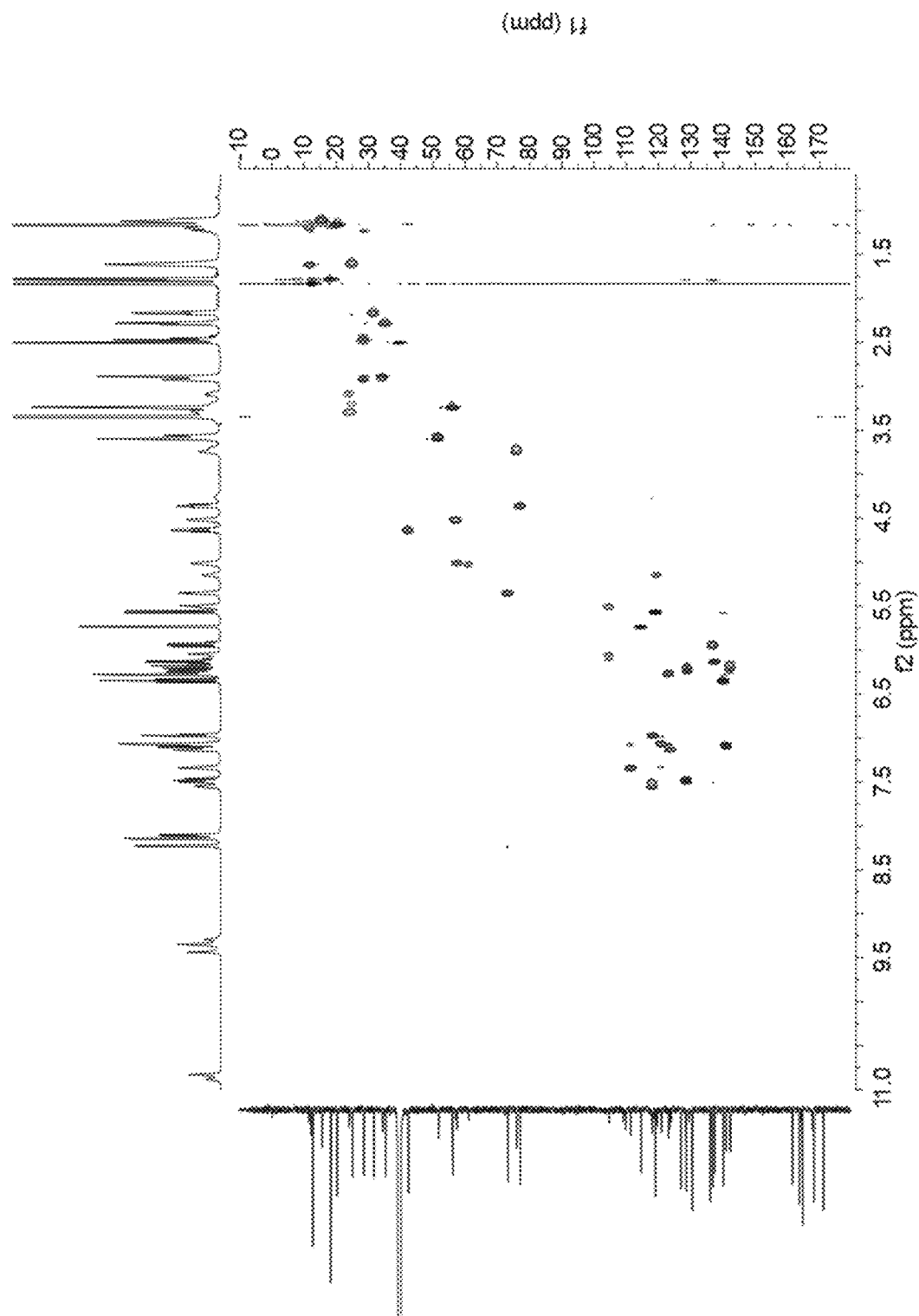
FIG. 16. HSQC spectrum of HTMA.
Figure 17:
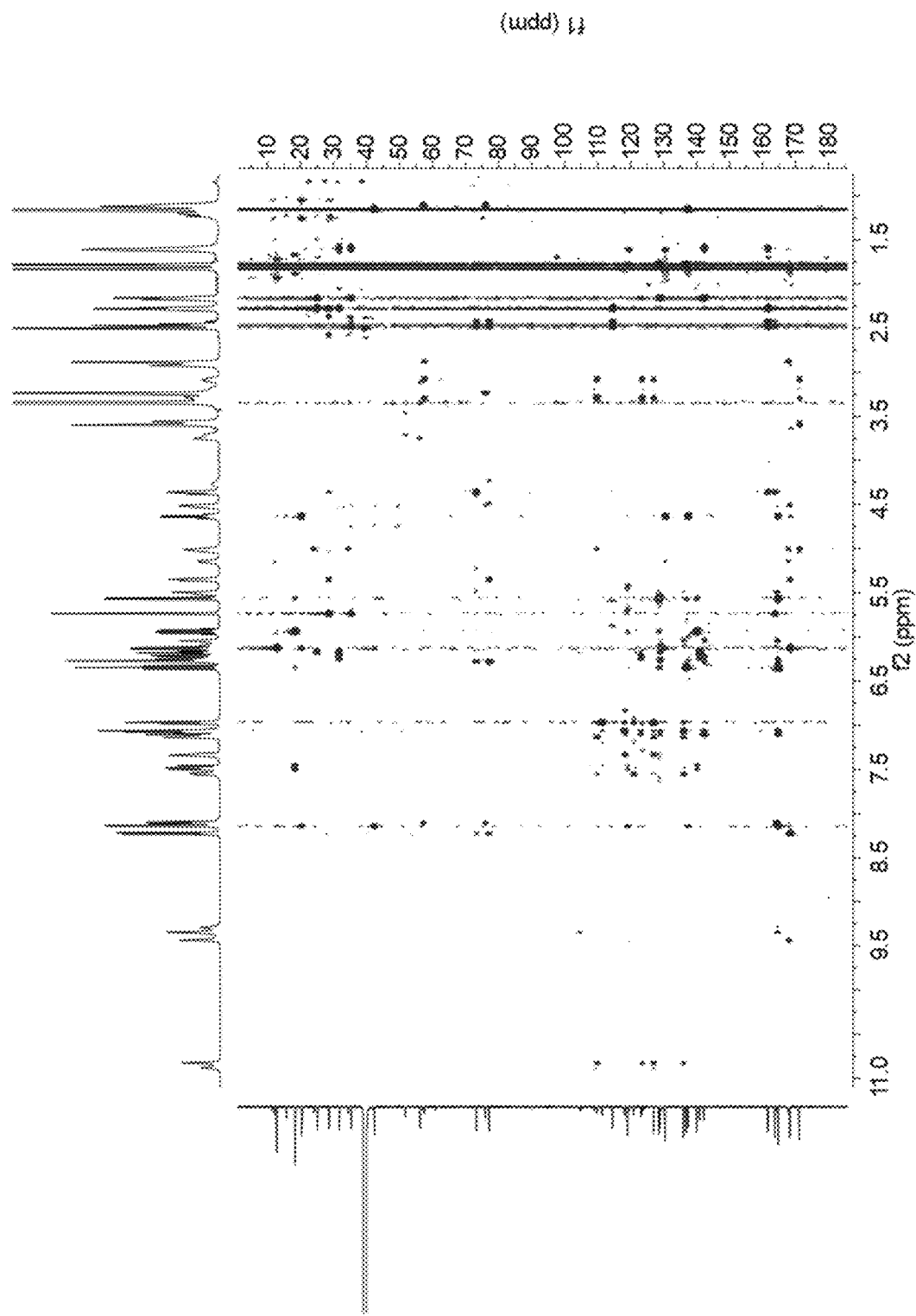
FIG. 17. HMBC spectrum of HTMA.
Figure 18:
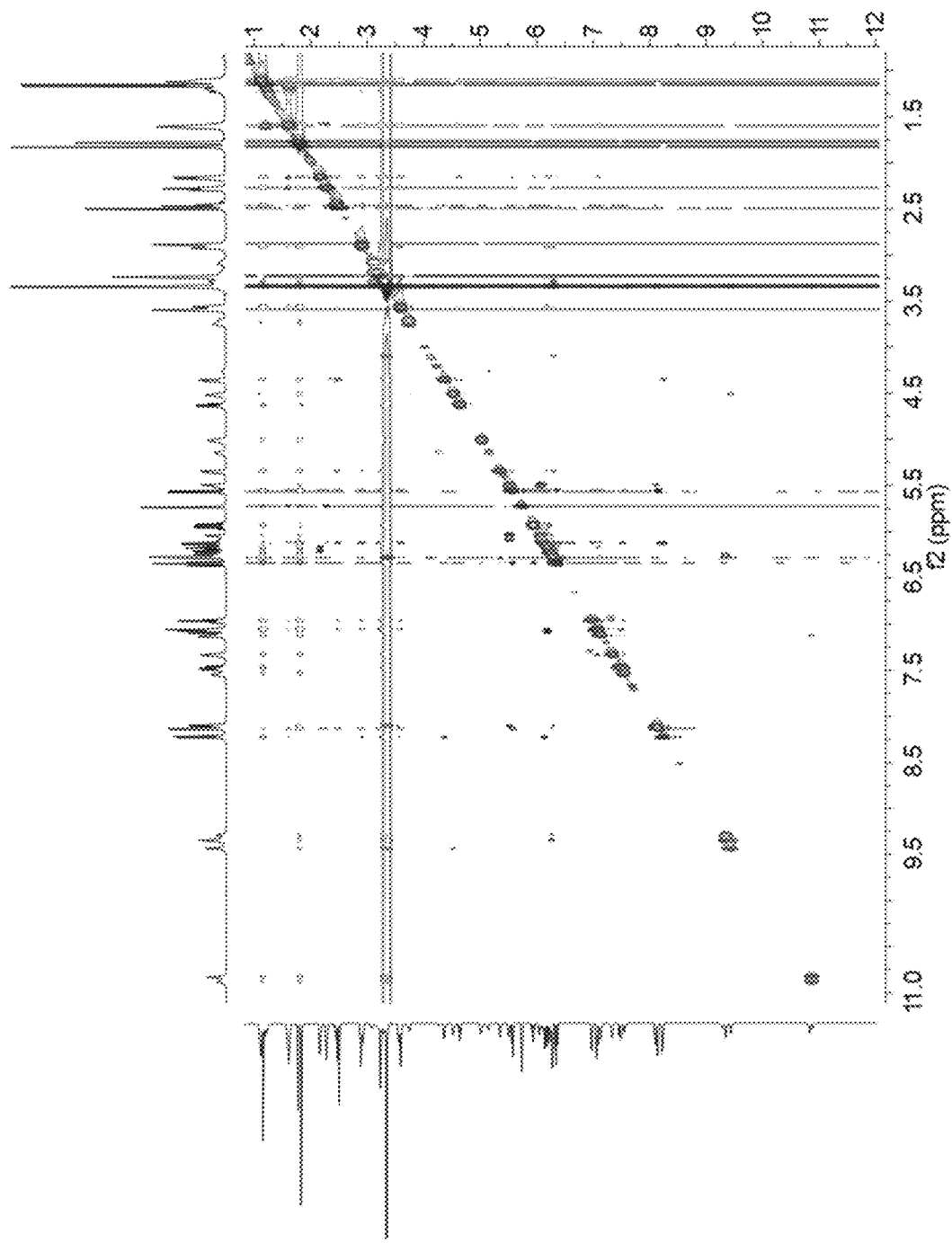
FIG. 18. $^1$H-$^1$H ROESY spectrum of HTMA.
Figure 19:
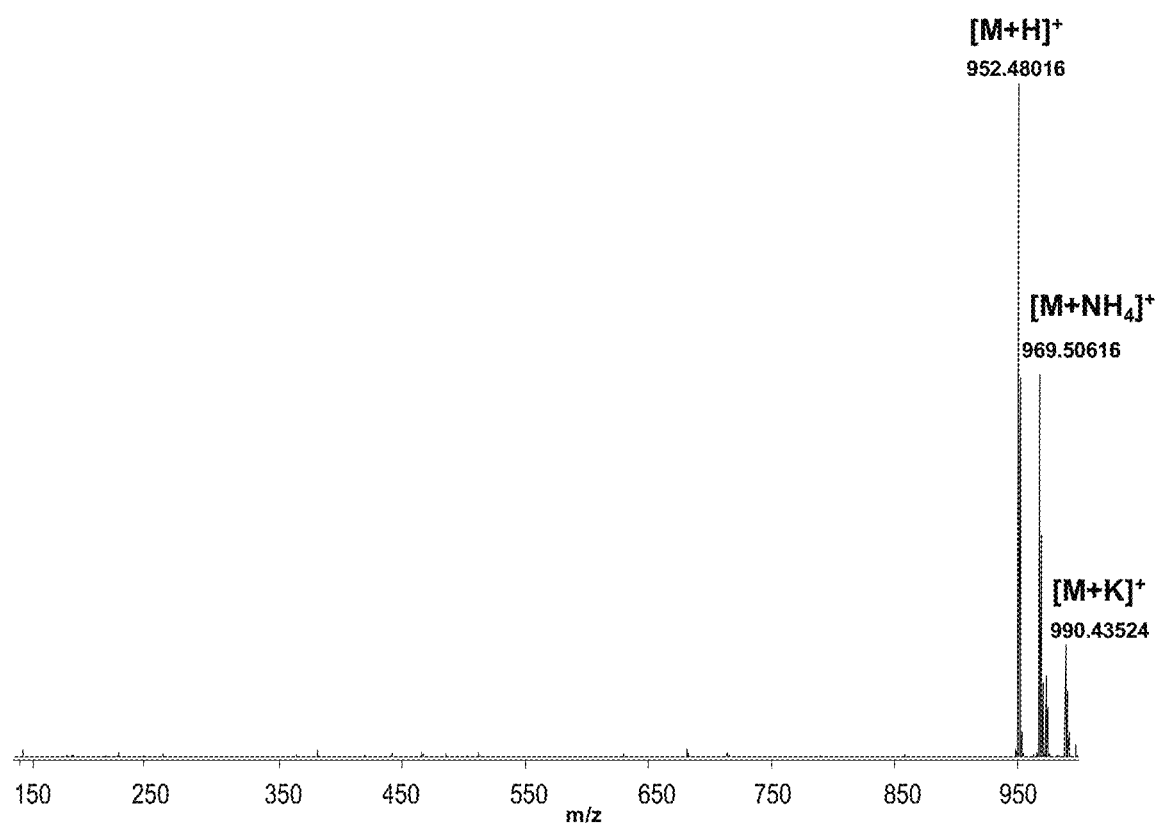
FIG. 19. ESI-HRMS spectrum of HTMB.
Figure 20:
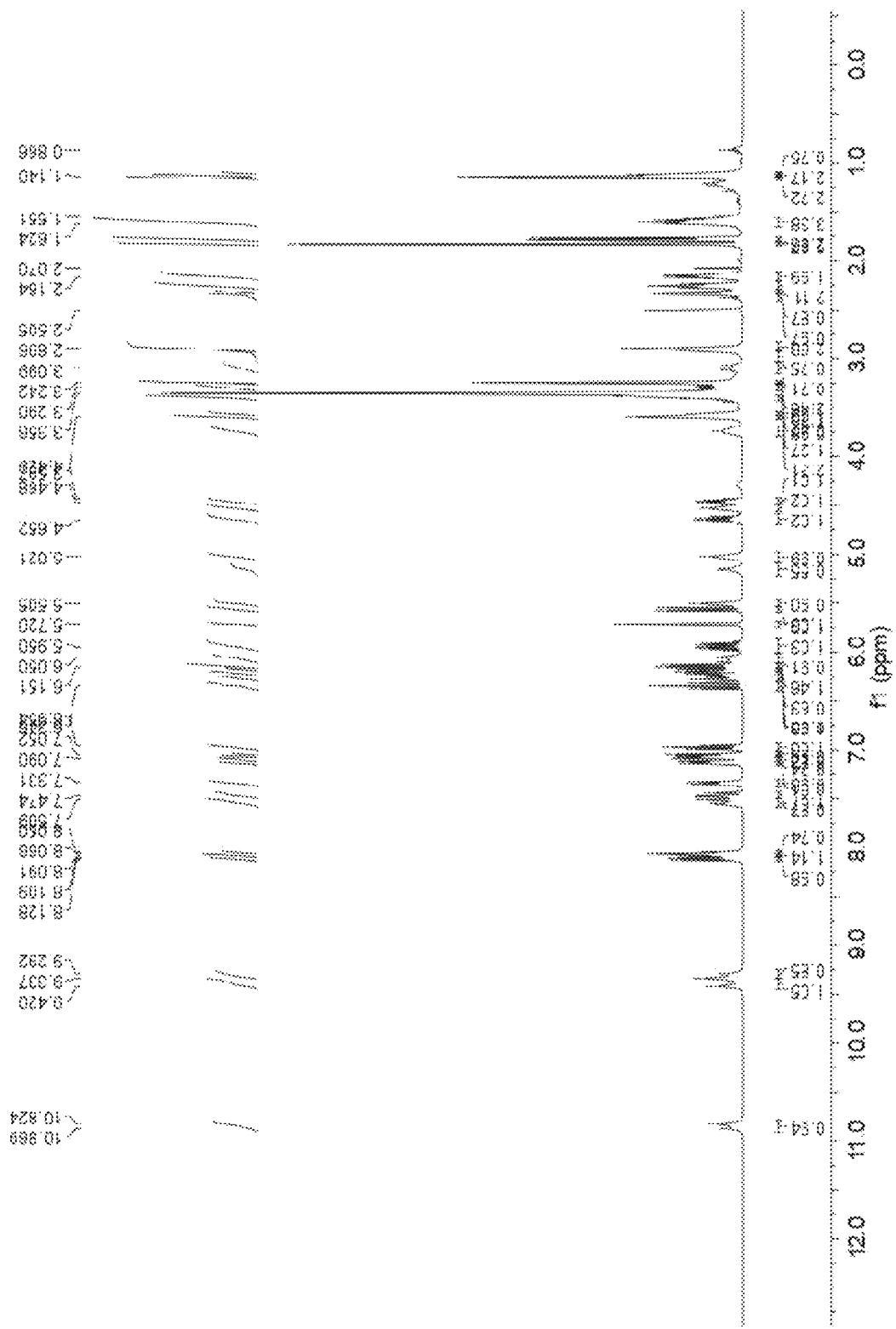
FIG. 20. $^1$H NMR spectrum of HTMB.
Figure 21:
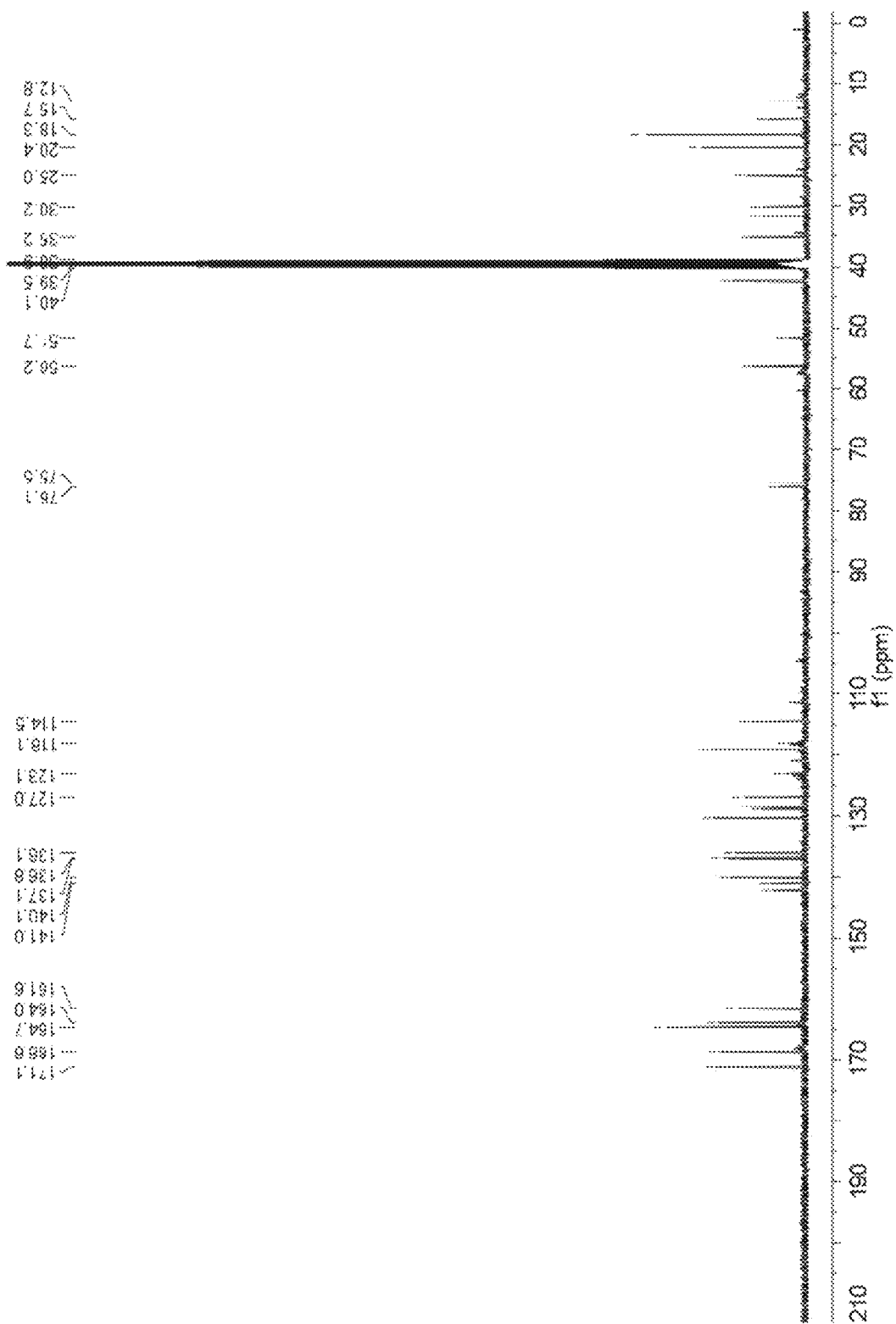
FIG. 21. $^{13}$C NMR spectrum of HTMB.
Figure 22:
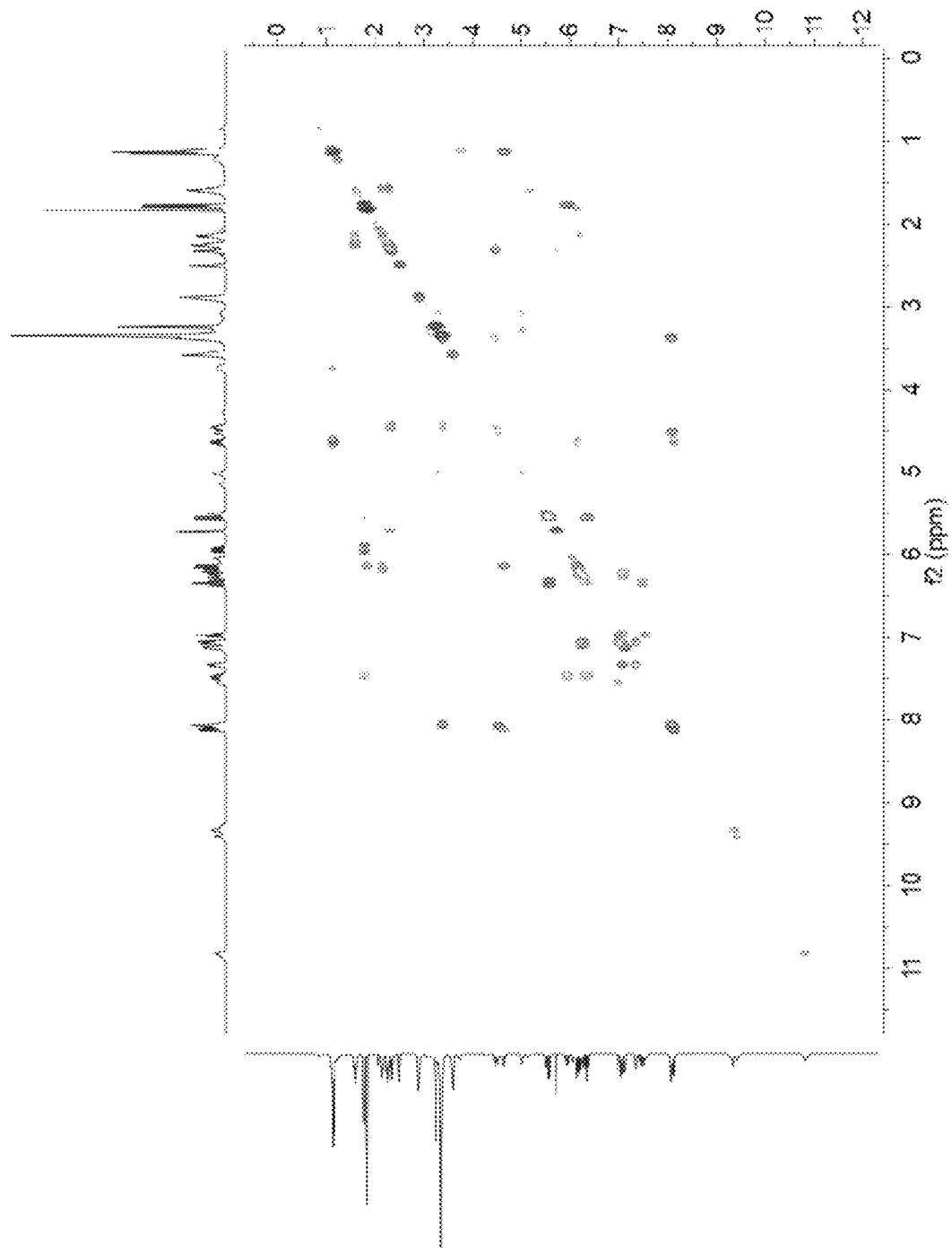
FIG. 22. $^1$H-$^1$H COSY spectrum of HTMB.
Figure 23:
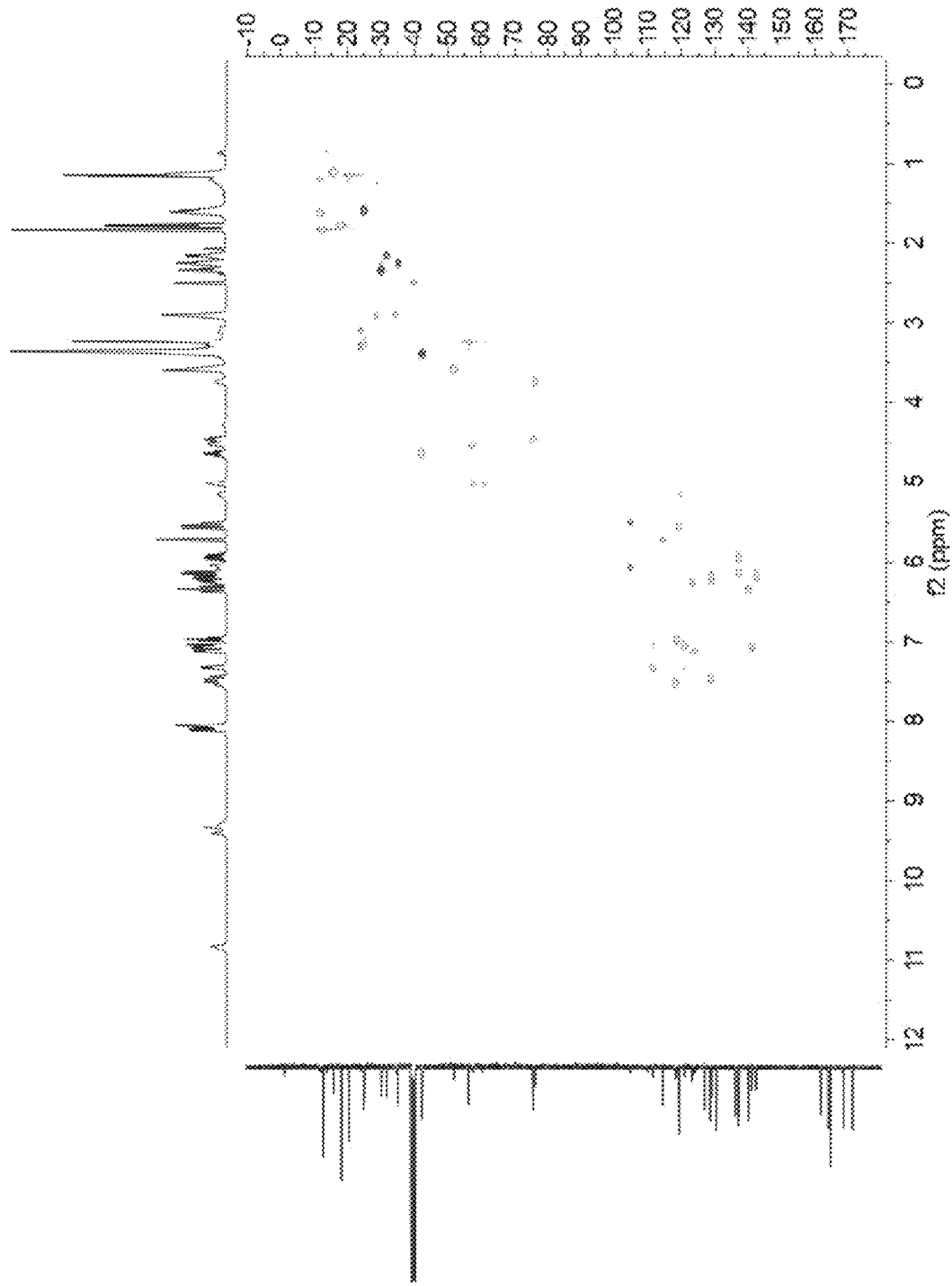
FIG. 23. HSQC spectrum of HTMB.
Figure 24:
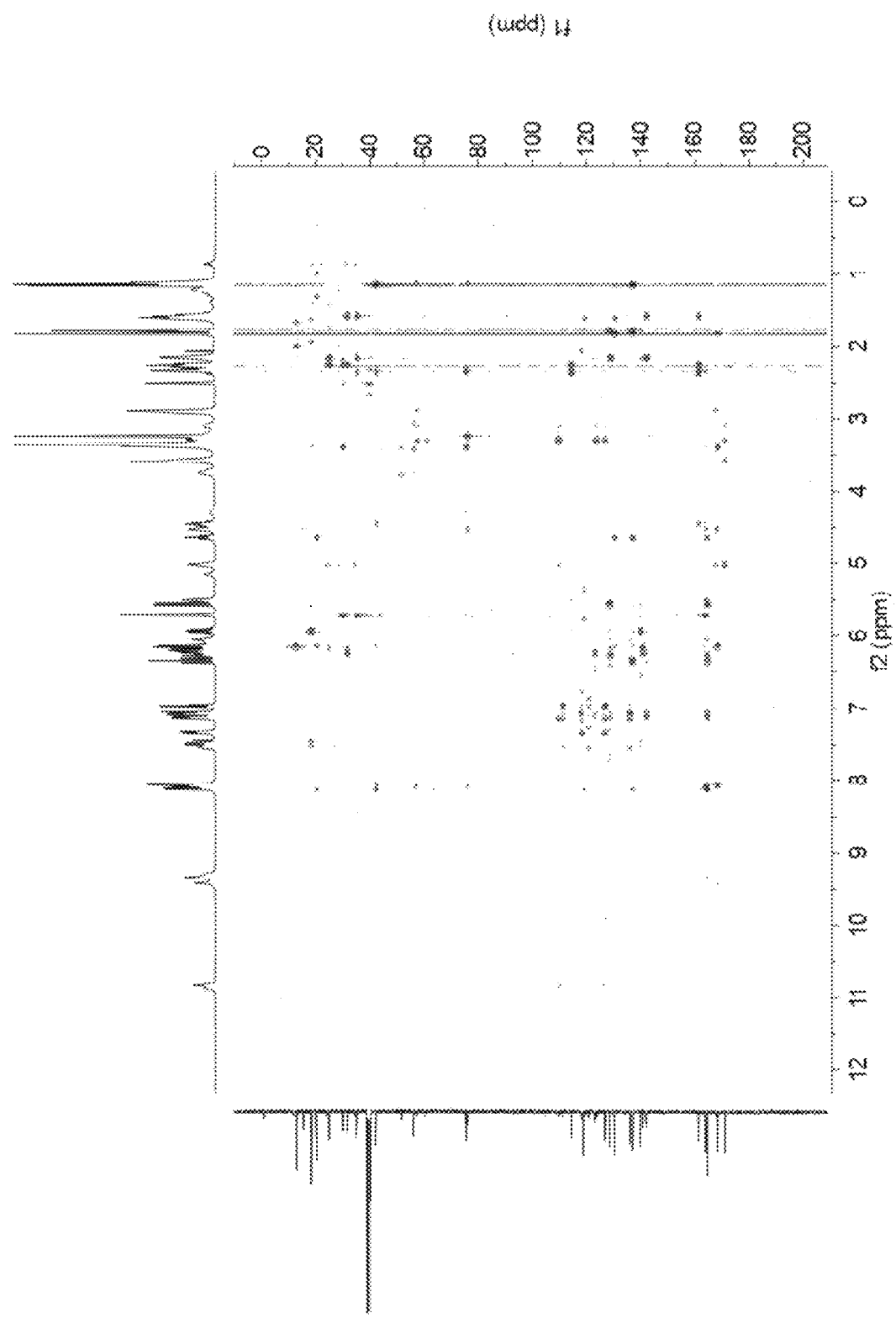
FIG. 24. HMBC spectrum of HTMB.
Figure 25:
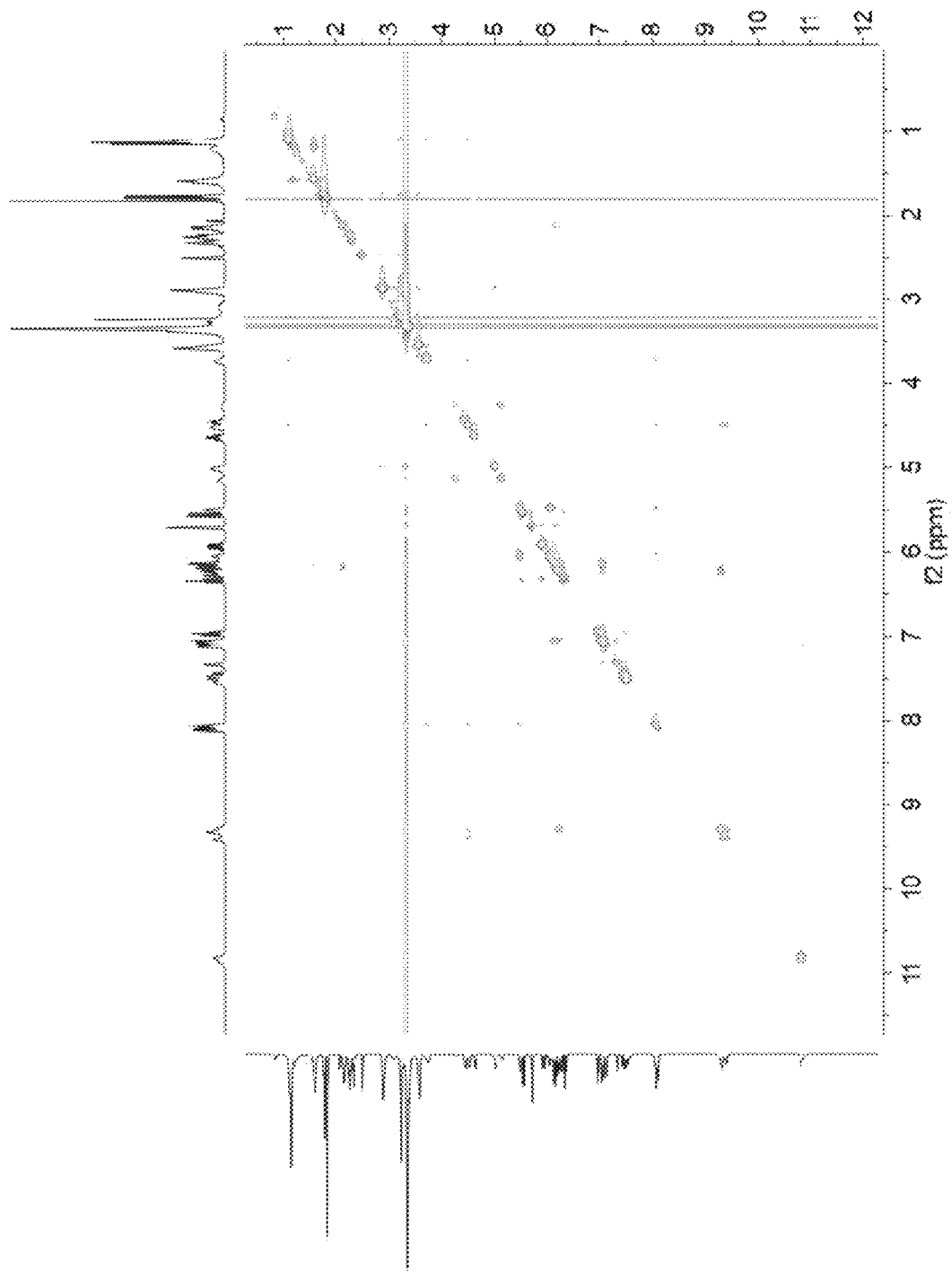
FIG. 25. $^1$H-$^1$H ROESY spectrum of HTMB.

High-resolution mass spectrometry detection (FIG. 12 (HTMA) and FIG. 19 (HTMB)) and nuclear magnetic resonance spectroscopy identification (FIGS. 13~18 (HTMA) and 20~25 (HTMB)) were performed on HTMA and HTMB. The nuclear magnetic data attribution data is shown in Table 4. The molecular formula of HTMA was determined to be $C_{51}H_{66}N_7O_{12}$, m/z 968.4756 ([M+H]$^+$, theoretical values $C_{51}H_{66}N_7O_{12}$, 968.4764) by high-resolution mass spectrometry. $^1$H spectrum shows that it contains 18 olefin proton signals, 5 amino/amide proton signals, and 8 methyl proton signals (including two oxygen-containing methyl groups at $\delta_H$ 3.23, 3.57 and one nitrogen-containing methyl group methyl group at $\delta_H$ 2.88), 5 methylene and 6 methylene proton signals. The remaining undisclosed signals in the $^1$H spectrum was further attributed by combining $^{13}$C-NMR and HSQC spectra. The results showed that HTMA contained 15 quaternary carbons, including 8 amide or ester carbonyls and 7 sp$^2$ unsaturated quaternary carbons. The correlation signals of NH-1/H-2, H-4/H-5/H-6/H-7 in the $^1$H-$^1$H COSY spectrum, as well as the correlation signals of NH-1/C-3, C-9; H-2/C-3, C-8, and C-9; H-4/C-3, C-6, C-8, C-9; H-5/C-4, C-6, C-7, C-9; H-7/C-5, C-6, C-8, C-9 in the HMBC spectrum indicate the presence of a C-3 substituted indole structural unit in the compound. And the chemical shifts of the two amide carbonyls $\delta_C$167.8 (C-13), 171.2 (C-16), together with a separate methoxy signal at ($\delta_H$ 3.57, $\delta_C$ 51.8), as well as the signals of H3-18/C-17, C-14; H-17/C-13, C-14, C-18; H-11/C-3, C-10, C-16; N—CH$_3$/C-11, C-13 in the HMBC correlation, indicates the presence of ring opening dipeptide structural units. The relevant signals in $^1$H-$^1$H COSY and HMBC further classified the signals as six spin coupled fragments of C-20/C-21 (21-OCH3)/C-22; C-25/C-26; C-29/C-30/C-31/C-32/C-33/C-34/C-35; C-37/C-38/C-42; C-45/C-46/C-47/C-48/C-49; C-52/C-53/C-54/C-55/C-56. The HMBC correction of H-20/C-19, C-24; NH-23/C-19, C-20, C-24; NH-27/C-24, C-25, C-28, C-29; H-29/C-28; H-35/C-36, C-37, C-40, C-41; H-38/C-40, C-36; H-42/C-44; H-46/C-44, C-47; H-47/C-44, C-48, C-49; H-48/C-47, C-51; NH-50/C-48, C-51, C-52 further connect these spin coupled fragments into a long fragment of C19-C56. This long fragment is further connected to the dipeptide moiety through peptide bonds formed by C-19, which corresponds to its chemical shift of $\delta_C$ 168.2 (C-19). The nuclear magnetic resonance data of the compound isolated from the gene knockout mutant strain ΔhtmP is very similar to that of HTMA, with the only difference being that one O atom is missing on high-resolution mass spectrometry, and its C42 hypomethoxy signal is replaced by a methylene signal. In summary, these two new compounds were identified and named as HTMA and HTMB respectively, their structural were shown in FIG. 1.

TABLE 4

$^{13}$C and $^1$H NMR data of HTMA and HTMB

| Position | HTMA $\delta_H$, multi. (J in Hz) | HTMA $\delta_C$, type | HTMB $\delta_H$, multi. (J in Hz) | HTMB $\delta_C$, type |
|---|---|---|---|---|
| 1 | 10.83, brs | | 10.84, d (18) | |
| 2 | 7.13, brs | 123.5, CH | 7.12, m | 123.5, CH |
| 3 | | 109.8, C | | 109.8, C |
| 4 | 7.53, d (7.2) | 118.2, CH | 7.54, d (1H, m) | 118.1, CH |
| 5 | 6.97, t (7.2) | 118.3, CH | 6.97, t (7.2) | 118.4, CH |
| 6 | 7.07, t (7.8) | 120.9, CH | 7.06, t (6.8) | 121.0, CH |
| 7 | 7.34, d (7.8) | 111.4, CH | 7.34, d (7.6) | 111.4, CH |
| 8 | | 136.1, C | | 136.1, C |
| 9 | | 127.0, C | | 127, C |
| 10 | 3.29, m; 3.09, m | 24.0, CH$_2$ | 3.29, m; 3.09, m | 24, CH$_2$ |
| 11 | 5.01, m | 57.5, CH | 5.03, m | 57.5, CH |
| 12N—CH$_3$ | 2.88, s | 34.4, CH$_3$ | 2.90, s | 34.4, CH$_3$ |
| 13 | | 167.8, C | | 167.8, C |
| 14 | | 130.5, C | | 130.3, C |
| 16 | | 171.2, C | | 171.1, C |
| 16—OCH$_3$ | 3.57, s | 51.8, CH$_3$ | 3.59, s | 51.7, CH$_3$ |
| 17 | 5.15, q (7.2) | 119.5, CH | 5.15, m | 119.5, CH |
| 18 | 1.62, m | 12.2, CH$_3$ | 1.62, m | 12.2, CH$_3$ |
| 19 | | 168.2, C | | 168.1, C |
| 20 | 4.52, m | 57.4, CH | 4.53, m | 57.3, CH |
| 21 | 3.74, m | 76.1, CH | 3.74, m | 76.1, CH |

TABLE 4-continued $^{13}C$ and $^1H$ NMR data of HTMA and HTMB

| | HTMA | | HTMB | |
|---|---|---|---|---|
| Position | $\delta_H$, multi. (J in Hz) | $\delta_C$, type | $\delta_H$, multi. (J in Hz) | $\delta_C$, type |
| 21—OCH$_3$ | 3.23, s | 56.2, CH$_3$ | 3.24, s | 56.2, CH$_3$ |
| 22 | 1.12, d (6) | 15.7, CH$_3$ | 1.11, d (6) | 15.7, CH$_3$ |
| 23 | 8.11, d (8.4) | | 8.11, d (8.4) | |
| 24 | | 164.4, C | | 164.4, C |
| 25 | | 136.2, C | | 136.2, C |
| 26 | 5.51, d (14.4); 6.07, d (14.4) | 104.7, CH$_2$ | 5.51, m; 6.06, 1H, m | 104.7, CH$_2$ |
| 27 | 9.36, s | | 9.31, d | |
| 28 | | 164.7, C | | 164.7, C |
| 29 | 6.27, d (15.6) | 123.1, CH | 6.26, m | 123.1, CH |
| 30 | 7.09, dd (15.6, 10.8) | 141.0, CH | 7.08, m | 141, CH |
| 31 | 6.21, m | 128.9, CH | 6.21, m | 128.9, CH |
| 32 | 6.18, dt (15.0, 6.6) | 142.3, CH | 6.19, m | 142.3, CH |
| 33 | 2.16, q (7.2) | 31.7, CH$_2$ | 2.15, m | 31.7, CH$_2$ |
| 34 | 1.6, m | 25.1, CH$_2$ | 1.58, m | 25, CH$_2$ |
| 35 | 2.28, t (7.2) | 35.3, CH$_2$ | 2.25, t (7.6) | 35.2, CH$_2$ |
| 36 | | 163.7, CH | | 164.0, CH |
| 37 | 2.47, t (8) | 28.6, CH$_2$ | 2.33, m | 30.2, CH$_2$ |
| 38 | 4.37, m | 77.2, CH | 4.46, m | 75.5, CH |
| 40 | | 161.6, C | | 161.6, C |
| 41 | 5.74, s | 114.6, CH | 5.72, s | 114.5 CH |
| 42 | 5.35, m | 73.3, CH | 3.39, m | 42.4, CH$_2$ |
| 43 | 8.22, d (8.4) | | 8.05, d (8.4) | |
| 44 | | 168.3, C | | 168.6, C |
| 45 | | 130.5, C | | 130.3, C |
| 46 | 1.83, s | 12.8, CH$_3$ | 1.83, s | 12.8, CH$_3$ |
| 47 | 6.13, d (7.8) | 137.4, CH | 6.14, m | 137.1, CH |
| 48 | 4.63, dd (14.4, 6.6) | 42.4, CH | 4.65, m | 42.3, CH |
| 49 | 1.16, d (6.6) | 20.3, CH$_3$ | 1.14, d (6.8) | 20.4, CH$_3$ |
| 50 | 8.14, d (7.8) | | 8.14, d (7.8) | |
| 51 | | 164.6, C | | 164.3, C |
| 52 | 5.57, d (11.4) | 119.1, CH | 5.57, d (11.2) | 119.1, CH |
| 53 | 6.35, t (11.4) | 140.1, CH | 6.35, t (11.2) | 140.1, CH |
| 54 | 7.49, m | 128.6, CH | 7.48, m | 128.6, CH |
| 55 | 5.94, m | 136.9, CH | 5.93, m | 136.8, CH |
| 56 | 1.78, d (6.6) | 18.3, CH$_3$ | 1.78, d (6.8) | 18.3, CH$_3$ |

Example 4. Cellular Assay for Hepatoprotective Activity of HTMA, HTMB and HTMP

Figure 26:
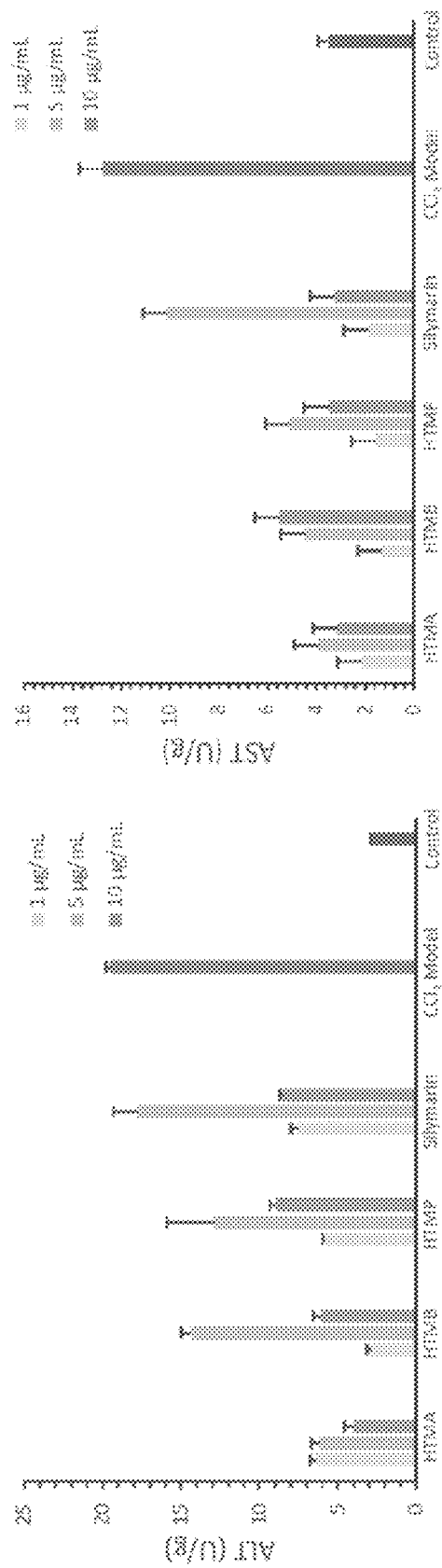
FIG. 26. Anti-liver injury activity cell test of HTMA, HTMAB, HTMP.

HepG2 cells were seeded into 24-well plates and kept at 37° C. in 5% CO$_2$ in order to achieve 80% fusion. To evaluate the effects of HTMA, HTMB, and HTMP on aspartate aminotransferase (AST) and alanine aminotransferase (ALT) activity, and compare the results with those of Silymarin (positive control) (FIG. 26), a cellular assay for hepatoprotective activity was carried out using a CCl$_4$-induced liver injury cell model. The cells were treated with the compounds followed by ultrasound disruption and cell homogenization to prepare the cell homogenates for analysis.

The results of the cellular assay for hepatoprotective activity using the liver injury cell model showed that compared with the blank control group, both ALT and AST levels significantly increased in the CCl$_4$ group, indicating successful modeling. Compared with the CCl$_4$ group, all three compounds, HTMA, HTMB, and HTMP, significantly reduced ALT and AST levels, suggesting that they have hepatoprotective activity.

Example 5. Animal Assay for Hepatoprotective Activity of HTMA

Figures 27A, 27B, 27C:
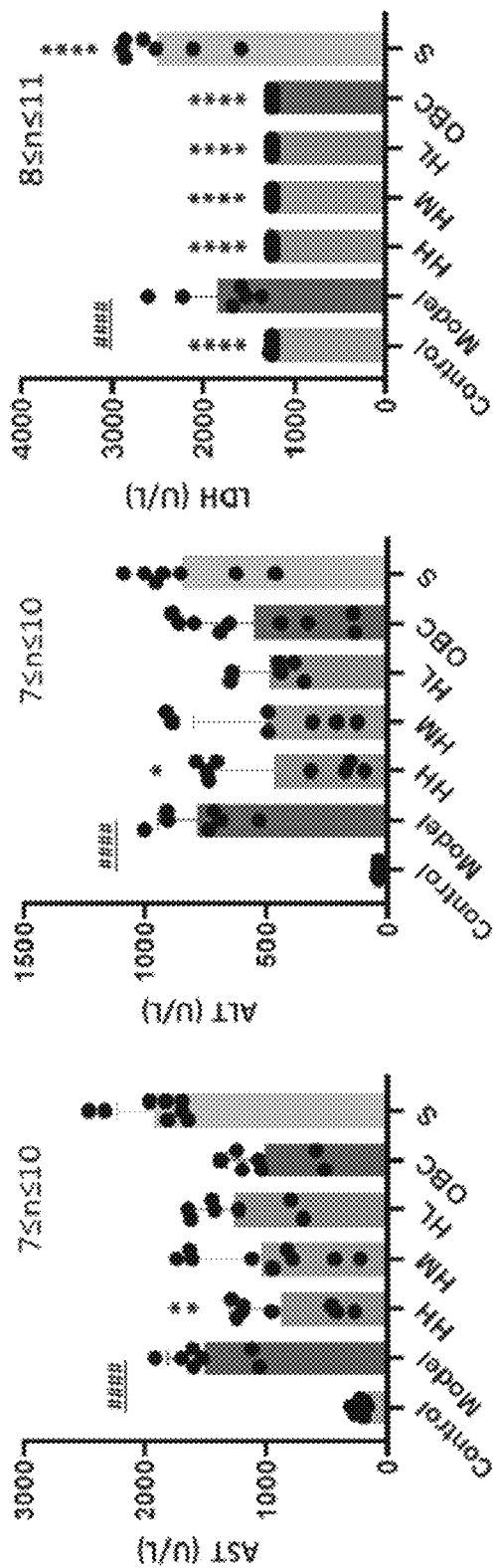
FIG. 27A: Alanine aminotransferase, ALT.
FIG. 27B: Aspartate aminotransferase, AST.
FIG. 27C: Lactate dehydrogenase, LDH. High (HH), medium (MH), low (LH) dose of HTMA; Obeticholic acid (OBC); Silymarin(S)

Male Wistar rats weighing around 220 g were randomly divided into 7 groups with 12 rats in each group. After grouping, they were fed a standard diet under standard conditions and were orally gavaged continuously. The dosages of the positive control groups obeticholic acid and silymarin were 10 mg/kg and 5 mg/kg respectively. The HTMA group was divided into low, medium, and high-dose groups with doses of 2.5, 5, and 10 mg/kg. The control and model groups were orally gavaged with 0.5% sodium carboxymethyl cellulose (solvent) daily. After 7 days of gavage, the rats fasted for 12 hours. On the 8th day, their weight was measured, and all rats except for the control group were intraperitoneally injected with alpha-naphthyl isothiocyanate (50 mg/kg, dissolved in olive oil) to induce liver injury. The rats in the control group were intraperitoneally injected with the same amount of olive oil. After two more days of gavage and 12 hours of fasting, blood samples were taken to detect biochemical indicators reflecting the degree of liver cell damage (FIGS. 27A~27C) and bile stasis (FIGS. 28A~28E), and liver immunohistochemical detection was performed (FIGS. 29A, 29B and 30A~30F).

The results of the biochemical indicators testing showed that all indicators in the liver injury model group were significantly higher than those in the control group, indicating the success of the model induction. Compared with the liver injury model group, high-dose HTMA (HH) could significantly reduce the levels of ALT, AST, LDH, TBA, TBIL, GGT, and ALP, confirming that HTMA has an anti-liver injury and bile stasis effect. Medium and low dose HTMA (MH and LH), obeticholic acid (OBC), and silymarin(S) all significantly reduced LDH levels but their effects on other biochemical indicators were weaker than that of high-dose HTMA, indicating that high-dose HTMA has a stronger anti-bile stasis and liver injury effect.

The immunohistochemistry test results showed that compared with the control group, the liver injury model group had mild overall tissue swelling, slight dilation of some liver sinuses, and a small amount of hepatocyte steatosis. The lipid droplets were located on one side of the cell nucleus, and there was fibrosis proliferation around the central vein with many inflammatory cells infiltrating, confirming the success of the model induction (FIG. 29A and FIG. 29B). Compared with the liver injury model group, all HTMA administration groups had normal liver portal structures, regular arrangement of liver cells into liver plates, radial arrangement of liver plates centered on the central vein, normal liver sinus size, occasional inflammatory cell infiltration around blood vessels, no edema or other pathological changes indicating that all doses of HTMA had a therapeutic effect on the pathological conditions of liver tissue damage (FIG. 30A~FIG. 30F).

Example 6. HTMA Protects the Cell Membrane of HepG2

Well-growing HepG2 cells were plated into confocal dishes with 1 mL of cell suspension containing $5\times10^5$ cells per dish. After 24 hours of incubation, pre-treat the cells with HTMA for 12 hours. The culture medium was removed from the confocal dish, then phenol red-free DMEM medium was added to the control group, 70% $CCl_4$ injury fluid was added to the model and treatment groups. The dishes were placed in a 37° C. incubator for 1 hour to induce liver injury. After modeling, the culture medium was removed, the cells were rinsed with PBS, and fixed with 4% paraformaldehyde at room temperature for 10 minutes. Then the cells were rinsed with PBS three times, each time for 5 minutes. 10 µM DiO was added to the dish and stained the cells at room temperature for 30 minutes. Then the cells were rinsed with PBS three times, each time for 5 minutes. DAPI was dropped to counterstain the cell nucleus, incubating it in the dark for 30 minutes, and then the cells were rinsed with PBS three times. The images of the cells were captured using a laser scanning confocal microscope (Leica TCS SP8). The experimental design includes two positive controls: silymarin(S) and obeticholic acid (OBC).

Figure 31:
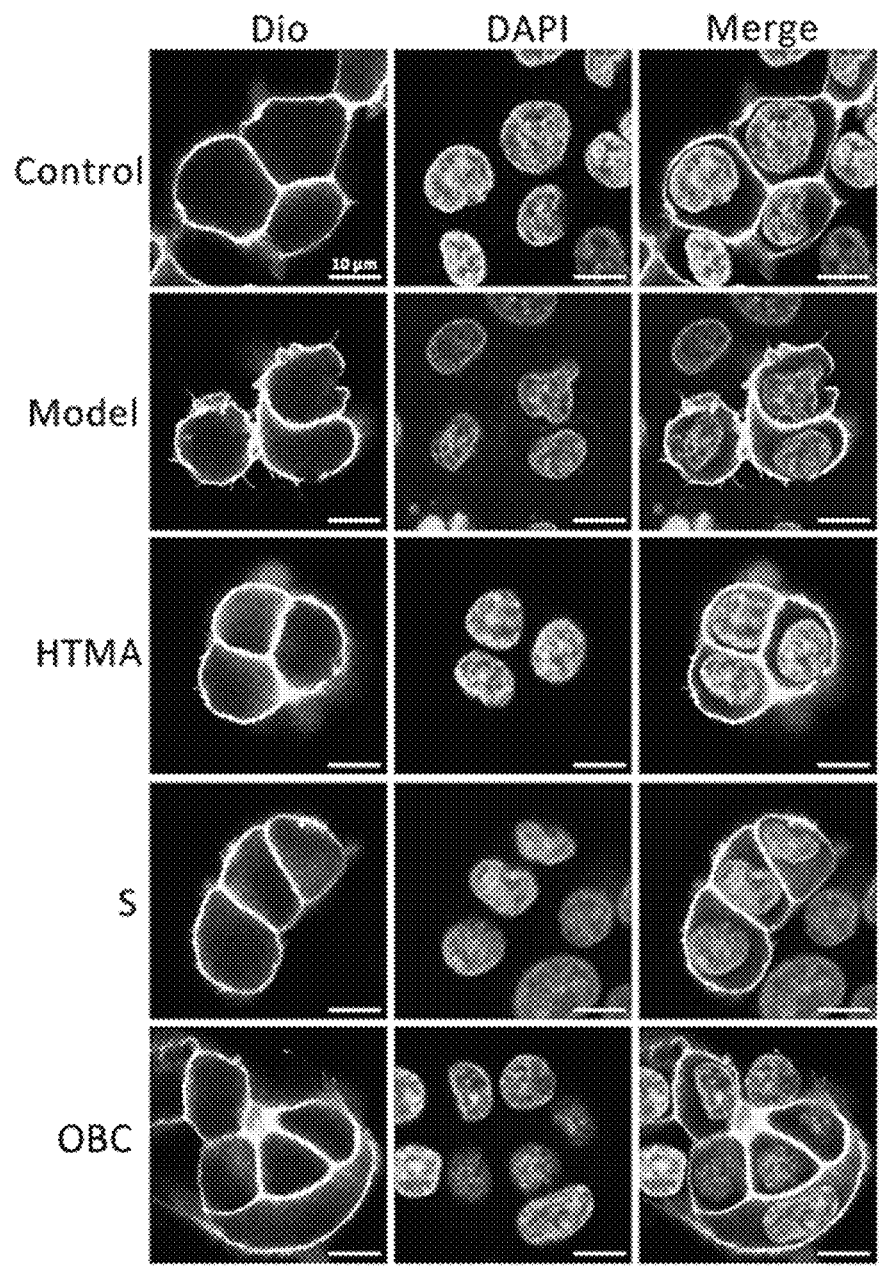
FIG. 31. HTMA protects the cell membrane of HepG2 (DiO: cell membrane; DAPI: nuclear; Merge: cell membrane and nuclear)
Figure 32A:
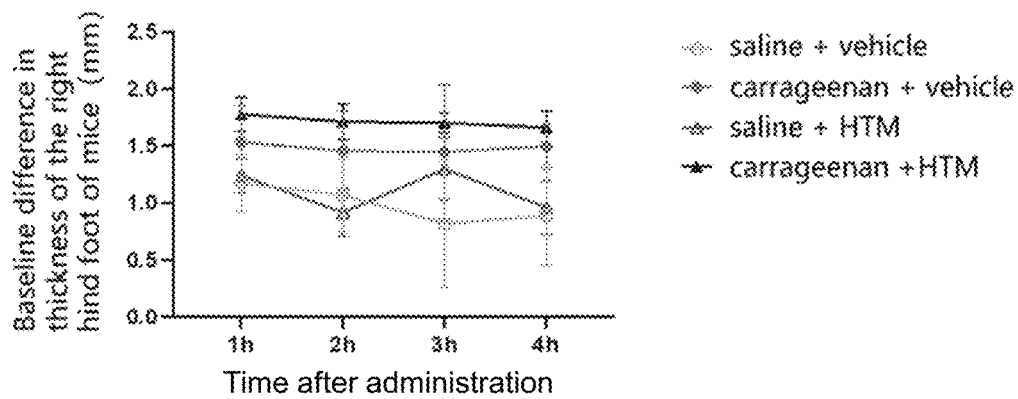
FIG. 32B: Changes in thickness of anti-inflammatory tissue swelling after administration of HTMP.
FIG. 32C: Changes in thickness of inflammatory tissue swelling after administration of HTMA.
FIG. 32D: Changes in thickness of inflammatory tissue swelling after administration of HTMB.
FIG. 32E: Changes in thickness of inflammatory tissue swelling after administration of the positive drug rapamycin.
FIG. 32F: Structural interrelationships of the four compounds HTM, HTMP, HTMA, HTMB and summary of changes in the thickness of inflammatory tissue swelling in the blank and model groups given HTM, HTMP, HTMA, HTMB, respectively. Saline was the blank group and carrageenan gum was the model group, **P<0.05)
Figure 32B:
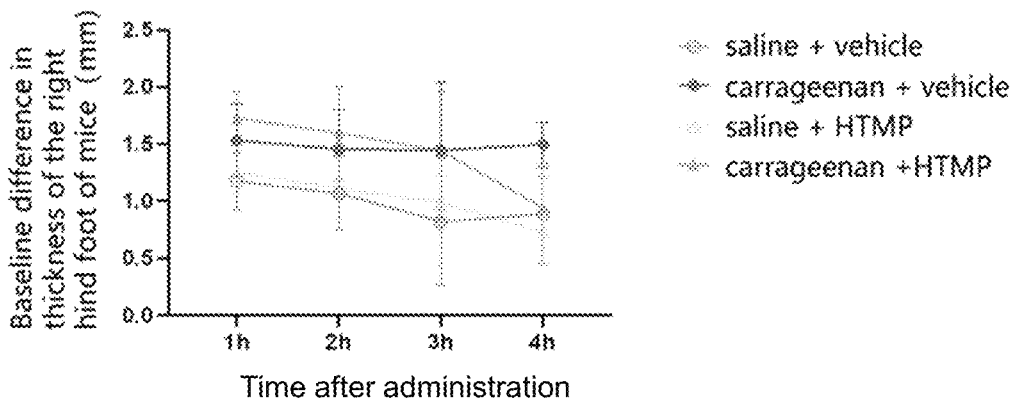
Figure 32C:
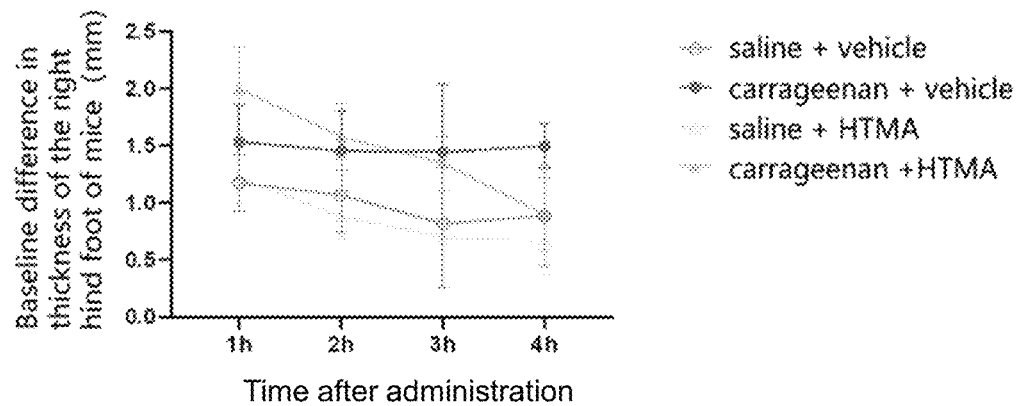
Figure 32D:
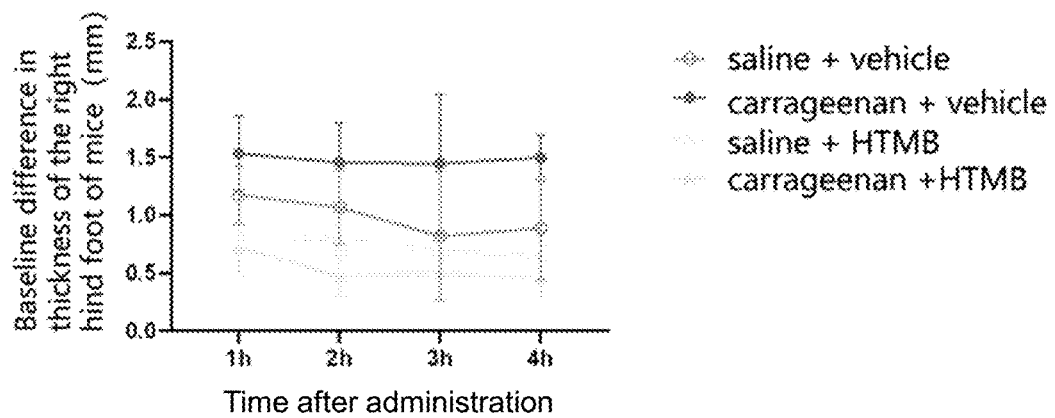
Figure 32E:
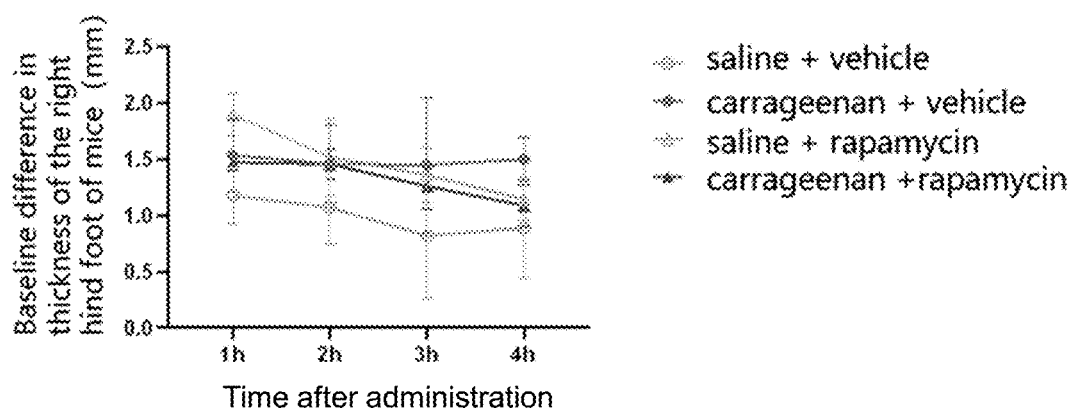
Figure 32F:
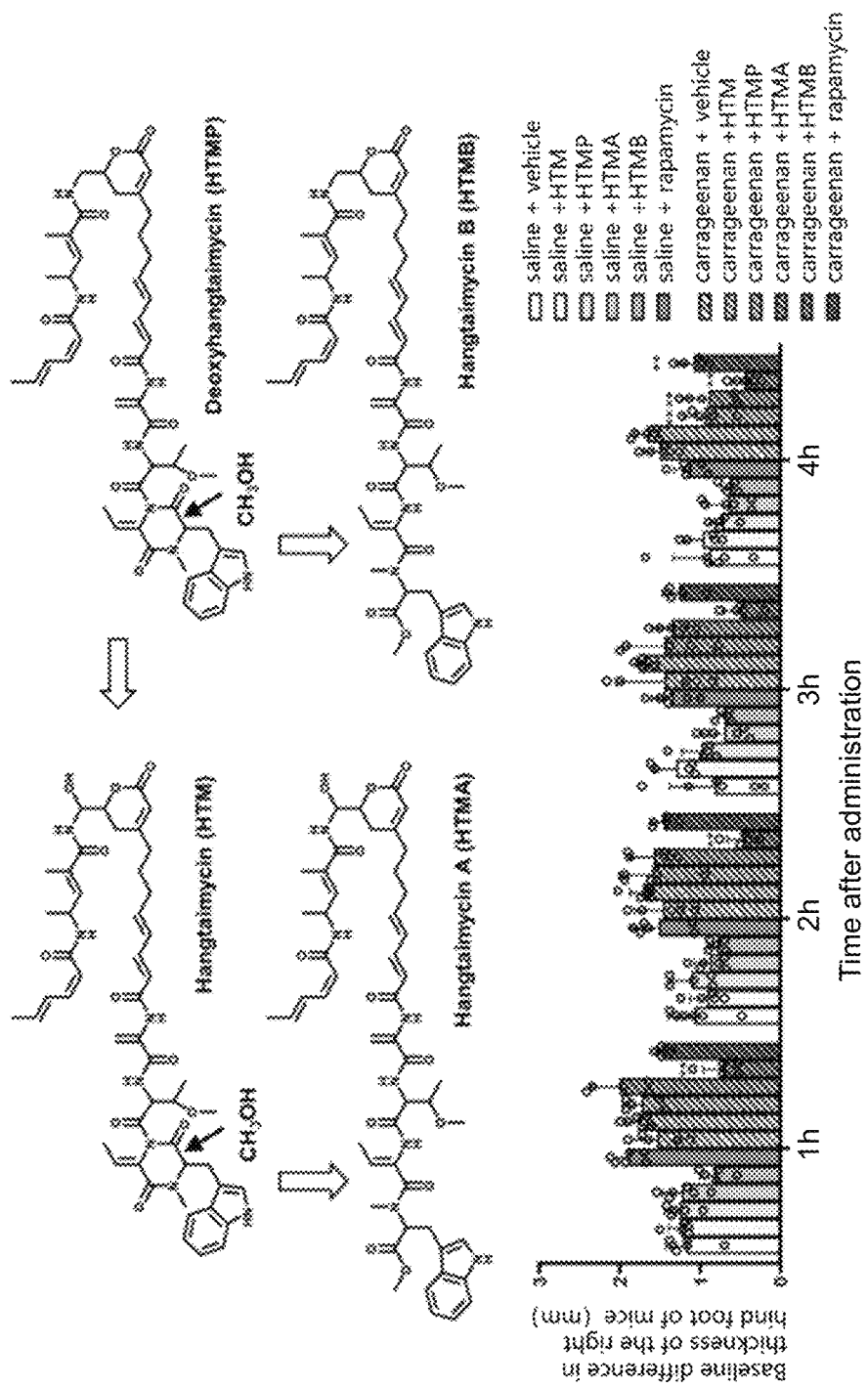
Figure 33:
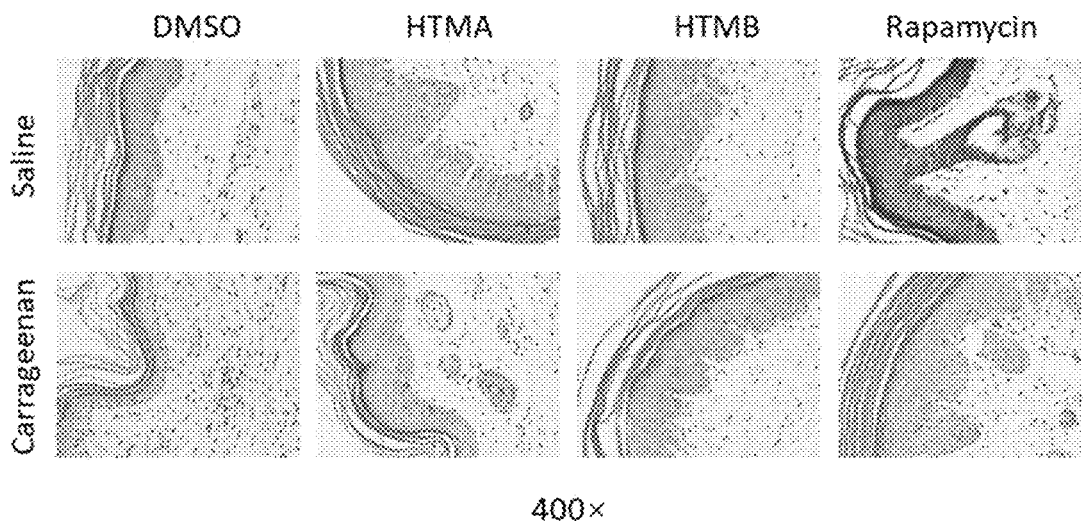
FIG. 33. Results of HE staining tests for anti-inflammatory effects of HTMA and HTMB.
Figure 34:
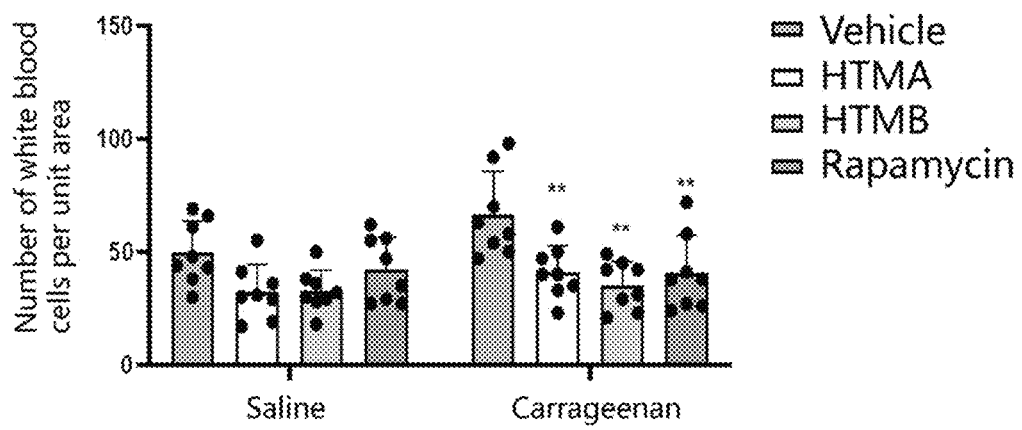
FIG. 34. Results of anti-inflammatory effects on leukocyte of HTMA and HTMB.

According to the results shown in FIG. 31, the detection of the liver injury cell model showed that compared with the control group, the fluorescence-labeled cell membrane in the control group was relatively smooth and had a regular morphology. In contrast, the fluorescence-labeled cell membrane in the model group was rough, with many irregular protrusions and gaps, indicating that the cell membrane was damaged and the modeling was successful.

Compared with the model group, the HTMA group had a more regular cell membrane morphology, with only occasional gaps present, but fewer than in the model group, indicating that HTMA has a protective effect on the cell membrane.

Example 7. The Anti-Inflammatory Effect of HTM and its Derivatives in Inflammatory Model Induced by Carrageenan Male Kunming mice weighing 18~22 g were adaptively reared for 1 day, and then randomly divided into 10 groups (5~6 mice per group): the saline+solvent group, the saline+HTM group, the saline+HTMP group, the saline+HTMA group, the saline+HTMB group, the saline+rapamycin (250 nM) group, the carrageenan+solvent group, the carrageenan+HTM group, the carrageenan+HTMP group, the carrageenan+HTMA group, the carrageenan+HTMB group, and the carrageenan+rapamycin (250 nM) group. Where doses used for HTM, HTMP, HTMA, and HTMB were set at 1, 3, and 10 mg/mL, and their solutions all contained 5% DMSO. Experiments were designed based on previous studies (Zhang et al., 2018). Carrageenan was used to induce paw inflammation, and the experimental procedure was as follows:

(1) The thickness of the right hind foot of mice was measured with a vernier caliper before the experiment, and the measurement site was marked.

(2) The experimental group was then subcutaneously injected into the right hind paw with 10 µL of different concentrations of compound solutions. The control group was injected with 10 µL saline into the right hind paw.

(3) After administration, the carrageenan group was injected subcutaneously with 30 µL of 1% carrageenan solution into the right hind paw, and the other groups were injected with an equal volume of saline. The thickness of the right hind foot of each mouse was measured at the same site every 1 hour for the following 4 hours to observe the effect of the compounds on the change in foot thickness.

The results showed (FIGS. 32A~32F, 33 and 34) that, compared with the carrageenan+solvent group, the right hind foot thickness in the carrageenan+HTMP (10 mg/mL) group, the carrageenan+HTMA (10 mg/mL) group, and the carrageenan+HTMB (10 mg/mL) group was reduced after 4 hours of carrageenan injection (P<0.05). And the carrageenan+HTMB (10 mg/mL) group showed significant differences compared with the carrageenan+HTMP (10 mg/mL) group and the carrageenan+HTMA (10 mg/mL) group. Moreover, HE staining results showed that there was a statistical difference in the number of leukocytes per unit area between the carrageenan+HTMB (10 mg/mL) group and the carrageenan+solvent group relative to the control group (P<0.05). The above results indicated that HTMP, HTMA, and HTMB could improve the inflammation caused by carrageenan. Among them, HTMB showed the best results.

Example 8. The Effect of Analgesic of HTMB in the Writhing Test

Figure 35:
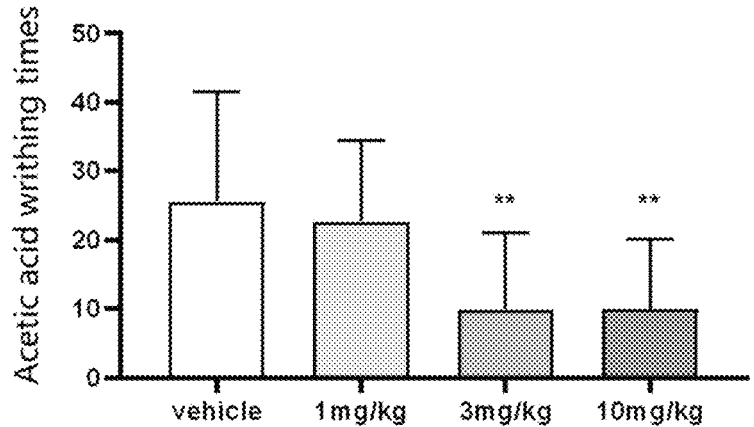
FIG. 35. Anti-inflammatory and analgesic effects results of HTMB.

The writhing test: Male Balb/c mice weighting 18~22 g were randomly divided into four groups (9~10 per group): the vehicle group (DMSO:saline=1:4, 1 ml/kg), the HTMB (1 mg/kg) group, the HTMB (3 mg/kg) group, and the HTMB (10 mg/kg) group. After tail vein administration for 30 minutes, mice were injected intraperitoneally with 10 mL/kg of freshly prepared 0.6% acetic acid (Rediet Tesfaye, et al. 2020), and the number of body twists of mice was observed and recorded within 20 minutes. The experimental results showed (FIG. 35) that the number of body twists in the HTMB (3 mg/kg) and HTMB (10 mg/kg) groups was significantly lower than that in the solvent group (P<0.05). It indicates that HTMB has an analgesic effect on acute inflammatory visceral pain caused by acetic acid.

Example 9. The Effect of HTMB for Prevention and Treatment on Drug Addiction Conditioned place preference (CPP) experiments: Morphine, an opioid representative, and cocaine, a euphoric representative, were used to establish a model of addiction. On the first day, the baseline was assessed by placing the rats in the center compartment of the CPP apparatus and allowing ad libitum access to all compartments for 15 minutes. And then, male SD rats were divided into the saline+morphine group, the HTMB (3 mg/kg)+morphine group, the saline+cocaine group, and the HTMB (3 mg/kg, i.p.)+cocaine group. The rats were exposed to CPP training from day 2 to 9. On the 10th day, the channel between the three boxes was opened, and the rats were allowed to move freely in the three boxes for 15 minutes for the CPP test.

The results showed that there was a difference in CPP scores in the saline+morphine group and the HTMB+morphine group (P<0.05), indicating that HTMB could inhibit morphine-induced CPP.

Drug reward memory reconsolidation: Morphine, an opioid representative, and cocaine, a euphoric representative, were used to establish model addiction. On the first day, baseline was assessed by placing the rats in the center compartment of the CPP apparatus and allowing ad libitum access to all compartments for 15 minutes. And then, male SD rats were divided into the saline+morphine group, the HTMB (3 mg/kg)+morphine group, the saline+cocaine group, and the HTMB (3 mg/kg, i.p.)+cocaine group. The rats were exposed to CPP training from day 2 to 9. On the 10th day, the channel between the three boxes was opened, and the rats were allowed to move freely in the three boxes for 15 minutes for the CPP test. On the 11th day, the CPP expressing rats screened for CPP formation were divided into four groups: the group I (morphine+saline), the group II (morphine+3 mg/kg HTMB), the group III (cocaine+saline), and the group IV (cocaine+3 mg/kg HTMB). After exposure to drug-paired box for 10 minutes, groups I and III were injected with saline (1 ml/kg, i.p.), and the groups II and IV were injected with HTMB (3 mg/kg, i.p.). 24 hours after injection, we defined this as 1 day of activation of the reward memory. The CPP scores were measured on the 7th day after reward memory activation. The results showed that there was a significant difference in CPP scores between the groups I and II (P<0.05), and there was a significant difference in CPP scores between the groups III and IV (P<0.05). These results suggest that HTM could inhibit morphine and cocaine reward memory reconsolidation in rats.

Figure 36:
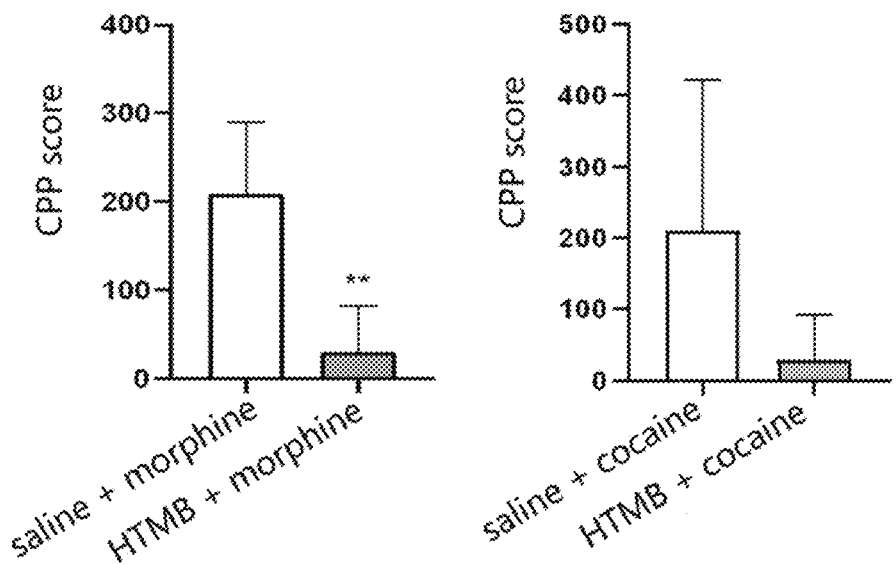
FIG. 36. Results of HTMB on drug addiction prevention.
Figure 37A:
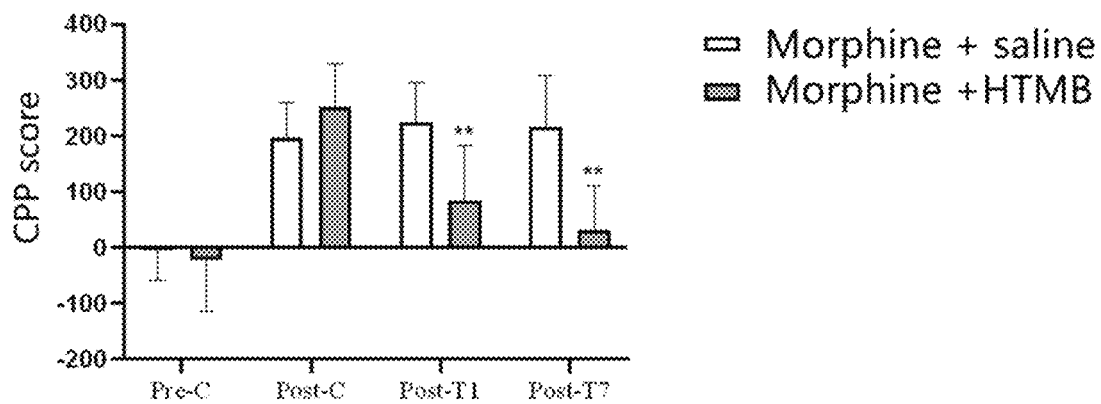
FIG. 37A and FIG. 37B. Results of HTMB treatment on drug addiction (Pre-C: baseline value; Post-C: CPP score; Post-T1: test value at day 1 after exposure; Post-T7: test value at day 7 after exposure)
Figure 37B:
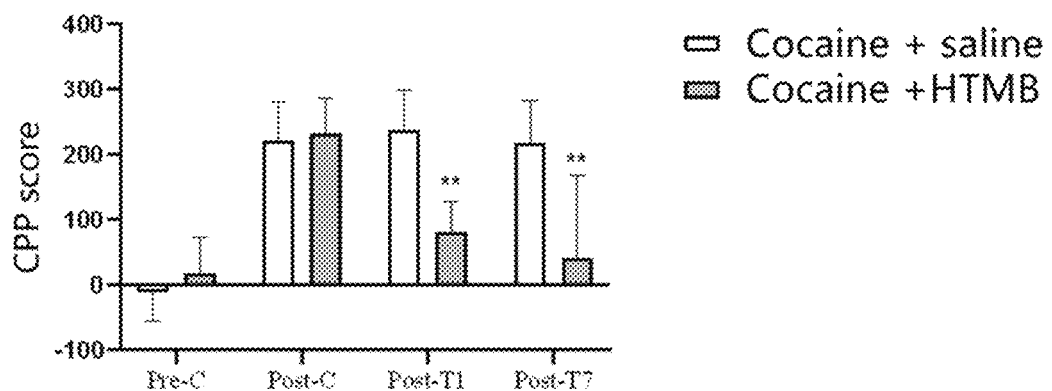

The above experimental results (FIGS. 36, 37A and 37B) indicate that HTMB has the effect of preventing and treating drug addiction.

Example 10. Determination for Antioxidant Activity of HTM and its Derivatives In this experiment, a 0.1 mM DPPH solution was prepared with ethanol, and each sample solution/dispersion was separately mixed with the DPPH solution in order to dilute it into a reaction product with a concentration gradient of 1~50 μg/mL to evaluate the concentration-dependent antioxidant potential. The reaction product was measured for its absorbance ($A_S$) at 517 nm using an ultraviolet-visible spectrophotometer, and its antioxidant activity was measured using DPPH removal as an indicator. The percentage of DPPH free radical scavenging is calculated by the following formula:

$$\text{Scavenging activity} = [(A_0 - A_S)/A_0] \times 100$$

$A_S$ is the absorbance of the sample and $A_0$ is the absorbance of the control (only DPPH solution).

Figure 38:
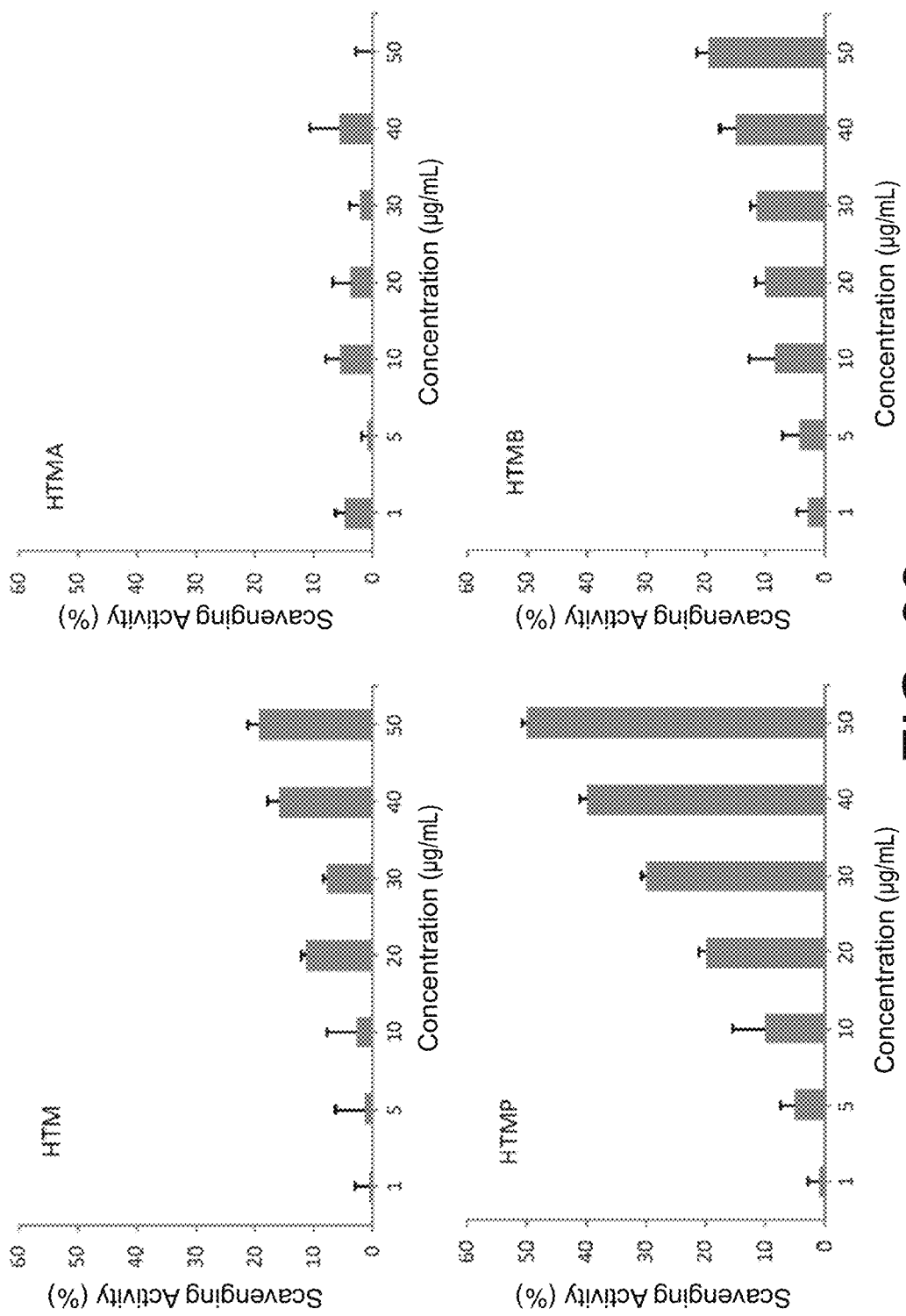
FIG. 38. Antioxidant activity of HTM, HTMA, HTMB, and HTMP.

These results show that HTM, HTMB, and HTMP have antioxidant capacity, while HTMA does not (FIG. 38).

Example 11. Determination for Antitumor Activity of HTM and its Derivatives

In a 96-well microplate, 100 μL of culture medium was put in each well and inoculate four cell strains with a fusion degree of 80% at a density of $8 \times 10^3$ cells. Cells were grown at 37° C., $CO_2$ (5%) and air (95%). Each 96-well plate was placed with a concentration gradient of 0~100 μg/mL of test compounds HTM, HTMA, HTMB, and HTMP. After 24 hours of incubation, the medium was removed, and 0.5 mg/mL MTT solution was added to each medium with cells and continue to incubate the cells for 4 hours at 37° C. Then 100 μL of DMSO was added to dissolve formazan crystals. Finally, absorbance was measured at 570 nm using a microplate reader (Bioteck EON, USA). The viability of the cells was calculated as the percentage of cell viability compared to vehicle control-treated cells, which were arbitrarily assigned as 100% viability. Each independent experiment was repeated five times. (*P<0.05, P<0.01, *P<0.001)

Cell survival rate (%) = (The absorbance of experimental group −

The absorbance of blank group/(The absorbance of control group −

The absorbance of blank group) × 100%.

Figure 39:
FIG. 39. Antitumor activity of HTM, HTMA, HTMB, and HTMP.

The results (FIG. 39) showed that HTMP had strong anti-cancer activity. At a concentration of 50 μg/mL, HTMP significantly inhibited the survival rate of bladder cancer, renal cancer, liver cancer, and breast cancer (P<0.01). At a concentration of 50 g/mL, HTM and HTMB both significantly inhibited the survival rate of bladder cancer, renal cancer, and breast cancer (bladder cancer, P<0.01; renal cancer, P<0.01; breast cancer, P<0.05). At a concentration of 50 μg/mL, HTMA significantly inhibited the survival rate of bladder cancer and breast cancer (P<0.01).

What is claimed is:

1. A Hangtaimycin derivative, comprising Hangtaimycin A or Hangtaimycin B, wherein the Hangtaimycin A and the Hangtaimycin B are alcoholysis derivatives, whose chemical structures are as following:

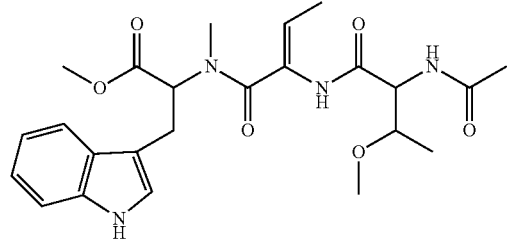

Hangtaimycin A (HTMA)

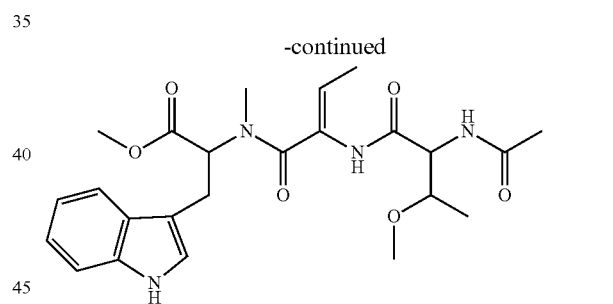

Hangtaimycin B (HTMB)

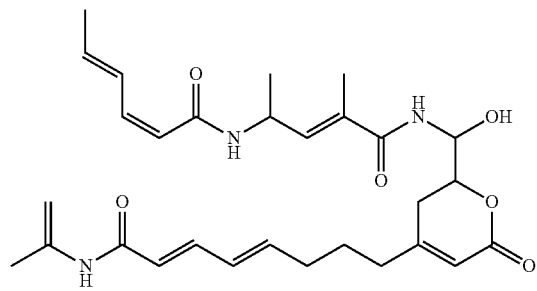

2. An anti-inflammatory swelling drug, comprising the Hangtaimycin A and/or the Hangtaimycin B, wherein the Hangtaimycin A and the Hangtaimycin B are the alcoholysis derivatives according to claim 1.

3. An analgesic drug used for a treatment of inflammatory pain, comprising the Hangtaimycin B, wherein the Hangtaimycin B is the alcoholysis derivative according to claim 1.

4. An anti-tumor drug used for inhibiting tumor growth, comprising the Hangtaimycin A and/or the Hangtaimycin B, wherein the Hangtaimycin A and the Hangtaimycin B are the alcoholysis derivatives according to claim 1.

5. A liver injury protective drug, comprising the Hangtaimycin A and/or the Hangtaimycin B, wherein the Hangtaimycin A and the Hangtaimycin B are the alcoholysis derivatives according to claim 1.

6. A drug for preventing and treating drug addiction, used for preventing and treating addiction of morphine and cocaine drugs, comprising the Hangtaimycin A and/or the Hangtaimycin B, wherein the Hangtaimycin A and the Hangtaimycin B are the alcoholysis derivatives according to claim 1.

* * * * *

SEQUENCE LISTING

```
Sequence total quantity: 6
SEQ ID NO: 1           moltype = DNA  length = 46
FEATURE                Location/Qualifiers
source                 1..46
                       mol_type = genomic DNA
                       organism = Streptomyces spectabilis
SEQUENCE: 1
tcaaggcgaa tacttcatat ggtcctcaac cgcaccgagt acaccc            46

SEQ ID NO: 2           moltype = DNA  length = 32
```

```
FEATURE          Location/Qualifiers
source           1..32
                 mol_type = genomic DNA
                 organism = Streptomyces spectabilis
SEQUENCE: 2
caacccette acctggaacg gccgcatcaa cg                              32

SEQ ID NO: 3     moltype = DNA  length = 35
FEATURE          Location/Qualifiers
source           1..35
                 mol_type = genomic DNA
                 organism = Streptomyces spectabilis
SEQUENCE: 3
cgttccaggt gaagggggttg aacagcggta tctgc                          35

SEQ ID NO: 4     moltype = DNA  length = 45
FEATURE          Location/Qualifiers
source           1..45
                 mol_type = genomic DNA
                 organism = Streptomyces spectabilis
SEQUENCE: 4
gacctgcagg catgcaagct tccgtgatcg tgcggtacgt gaggt                45

SEQ ID NO: 5     moltype = DNA  length = 21
FEATURE          Location/Qualifiers
source           1..21
                 mol_type = genomic DNA
                 organism = Streptomyces spectabilis
SEQUENCE: 5
cggctccttc gtcaacttcc t                                          21

SEQ ID NO: 6     moltype = DNA  length = 22
FEATURE          Location/Qualifiers
source           1..22
                 mol_type = genomic DNA
                 organism = Streptomyces spectabilis
SEQUENCE: 6
ctcctgctct catcctggtc ac                                         22
```